(12) United States Patent
Lee

(10) Patent No.: US 9,703,396 B2
(45) Date of Patent: Jul. 11, 2017

(54) HIGH RESOLUTION AND HIGH SENSITIVITY THREE-DIMENSIONAL (3D) CURSOR MANEUVERING REFERENCE PLANE, AND METHODS OF ITS MANUFACTURE

(71) Applicant: Wen-Chieh Geoffrey Lee, Taipei (TW)

(72) Inventor: Wen-Chieh Geoffrey Lee, Taipei (TW)

(*) Notice: Subject to any disclaimer, the term of this patent is extended or adjusted under 35 U.S.C. 154(b) by 28 days.

(21) Appl. No.: 14/328,740

(22) Filed: Jul. 11, 2014

(65) Prior Publication Data

US 2015/0015491 A1 Jan. 15, 2015

Related U.S. Application Data

(60) Provisional application No. 61/845,533, filed on Jul. 12, 2013.

(51) Int. Cl.
*G06F 3/0346* (2013.01)

(52) U.S. Cl.
CPC .................. *G06F 3/0346* (2013.01)

(58) Field of Classification Search
None
See application file for complete search history.

(56) References Cited

U.S. PATENT DOCUMENTS

| | | | | |
|---|---|---|---|---|
| 4,647,771 A | * | 3/1987 | Kato | G06F 3/0395 250/221 |
| 4,880,967 A | * | 11/1989 | Kwang-Chien | G06F 3/03543 250/221 |
| 5,349,371 A | * | 9/1994 | Fong | G06F 3/0317 250/221 |

(Continued)

OTHER PUBLICATIONS

"Ink-Paper Interaction, a study in ink-jet color reproduction," Linkoping Studies in Science and Technology Dissertations No. 806 by Li Yang, Apr. 2003, Linkoping University, Sweden, pp. 13 and 14, ISBN 91-7373-613-9.
"CMOS Image Sensors for High Speed Applications," by Munir El-Desouki, et al., Sensors 2009, Jan. 13, 2009, pp. 430-444, ISSN 1424-8220.

(Continued)

*Primary Examiner* — David D Davis
(74) *Attorney, Agent, or Firm* — Saile Ackerman LLC; Stephen B. Ackerman

(57) ABSTRACT

A three dimensional (3D) cursor maneuvering system for use by a computer or electro-mechanical system requiring 3D control, includes a tinted 2D planar or locally planar reference surface and a color sensitive mobile device that moves along the tinted reference surface and generates high sensitivity and high resolution absolute positional and motional data by accurately determining variations in the tint. Color index data (e.g. CIE 1931 RGB, etc.) on the tinted reference plane varies from place to place and methods are disclosed for imprinting the reference plane with that data in the form of dyes and pigments that may be reflective, refractive or emissive. When the mobile device moves on or over the reference surface, it captures a series of images whose data (e.g. CIE 1931 RGB) varies in correspondence with the movement of the device. The color index data measured by the mobile device can be mathematically converted into 3D positional and motional data. Hence, the color index data provides an ideal method for generating 3D positional and motional data as compared with the 2D data provided by the conventional optical mouse and mouse pad system.

13 Claims, 13 Drawing Sheets

(56) References Cited

U.S. PATENT DOCUMENTS

| | | | | |
|---|---|---|---|---|
| 5,463,387 A * | 10/1995 | Kato | G06F 3/0317 250/229 |
| 5,587,728 A * | 12/1996 | Edgar | H04N 1/40031 347/19 |
| 5,696,536 A * | 12/1997 | Murphy | G06F 3/0395 248/346.01 |
| 6,256,016 B1 * | 7/2001 | Piot | G06F 3/0317 250/208.2 |
| 6,383,607 B1 * | 5/2002 | Shin | B32B 3/30 106/36 |
| 8,553,235 B1 * | 10/2013 | Lee | G01B 11/14 345/175 |
| 8,890,815 B2 * | 11/2014 | Bilbrey | H04N 1/00347 345/166 |
| 2006/0044276 A1 * | 3/2006 | Baer | G06F 3/03544 345/166 |
| 2007/0146325 A1 * | 6/2007 | Poston | G06F 3/0317 345/163 |
| 2007/0215792 A1 * | 9/2007 | Cheah | G06F 3/0317 250/221 |
| 2009/0128552 A1 * | 5/2009 | Fujiki | G06T 15/06 345/419 |
| 2012/0314902 A1 * | 12/2012 | Kimura | G06F 3/017 382/103 |
| 2013/0002555 A1 * | 1/2013 | Lee | G06F 3/042 345/166 |
| 2013/0241835 A1 * | 9/2013 | Lee | G06F 3/03543 345/166 |
| 2013/0265218 A1 * | 10/2013 | Moscarillo | G06F 3/017 345/156 |
| 2014/0160021 A1 | 6/2014 | Lee | |
| 2014/0327611 A1 * | 11/2014 | Ono | G06F 3/0425 345/156 |
| 2014/0354548 A1 * | 12/2014 | Lee | G06F 3/0346 345/166 |
| 2015/0029100 A1 * | 1/2015 | Cheng | G06F 3/03543 345/158 |
| 2015/0049021 A1 * | 2/2015 | Cheng | G06F 3/0325 345/163 |

OTHER PUBLICATIONS

Principles of Color Technology, Third Edition, by Roy S. Berns, John Wiley & Sons, Inc, New York, pp. 56-57, Copyright 2000.

"Review of CMOS Image Sensors," by M. Bigas, et al., Microelectronics Journal 37, May 2006, pp. 433-451.

"TwistMouse for Simultaneous Translation and Rotation," by Jacqui Hannagan, a dissertation submitted for the partial fulfilment of the requirements for the degree of Bachelor of Commerece (Honours) at the University of Otago, Dunedin, New Zealand, Nov. 14, 2007, pp. 1-117.

Co-pending US Patent, High Resolution and High Sensitivity Three-Dimensional (3D) Curson Maneuvering Device, U.S. Appl. No. 14/294,369, field Jun. 3, 2014, by Wen-Chieh Geoffrey Lee, 110 pgs.

* cited by examiner

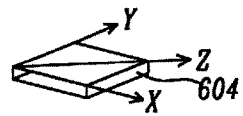
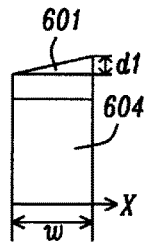
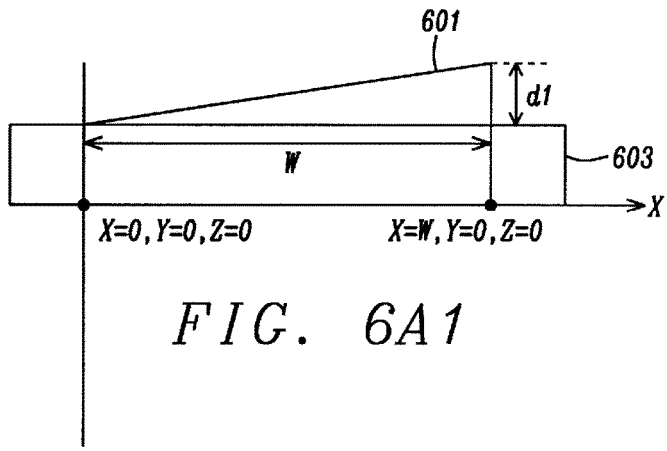
FIG. 6A2
FIG. 6A1
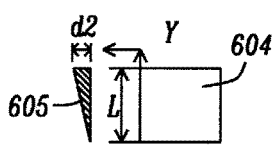
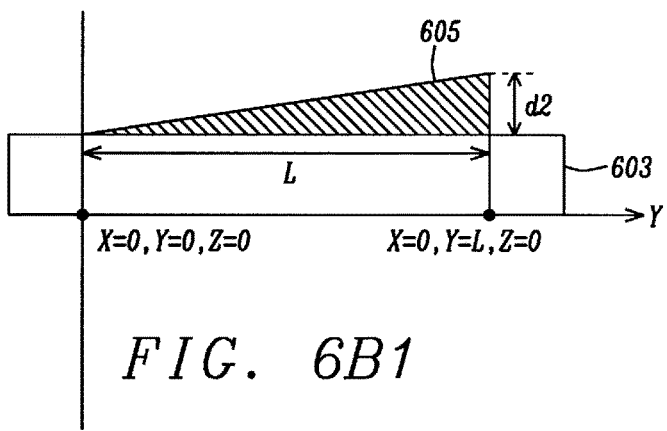
FIG. 6B2
FIG. 6B1
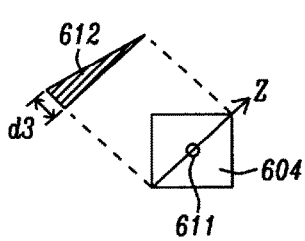
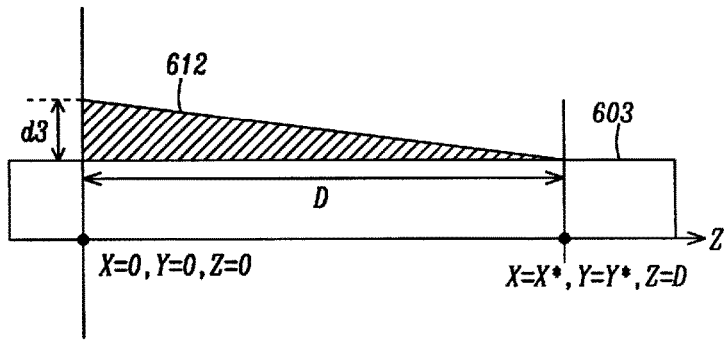
FIG. 6C2
FIG. 6C1

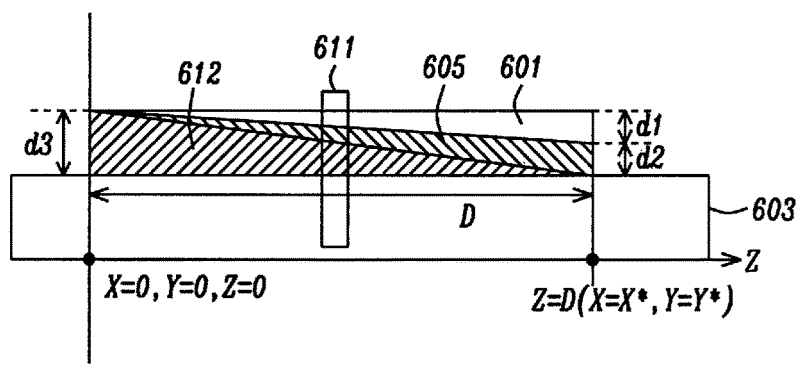
FIG. 6D1
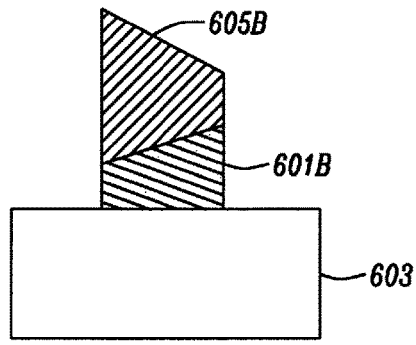
FIG. 6D2
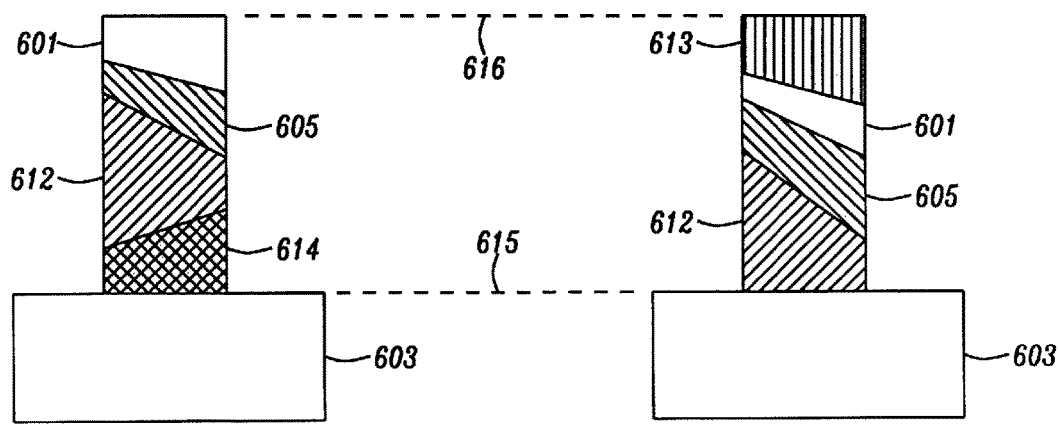
FIG. 6D3  FIG. 6D4

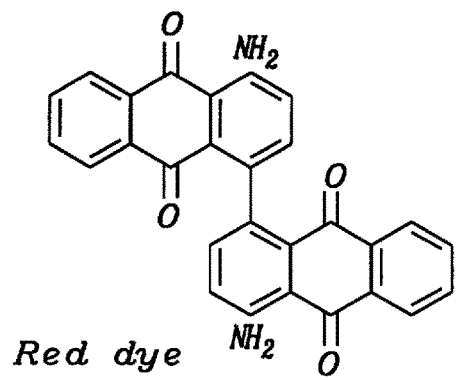
Red dye
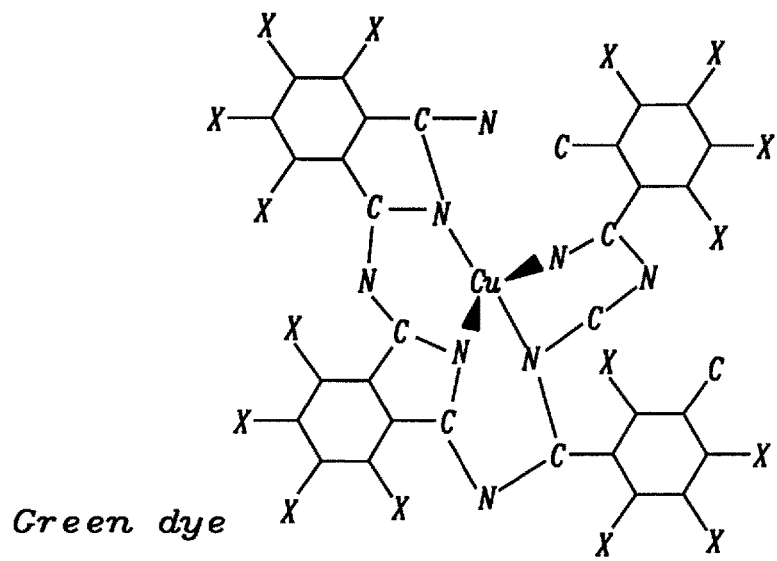
Green dye
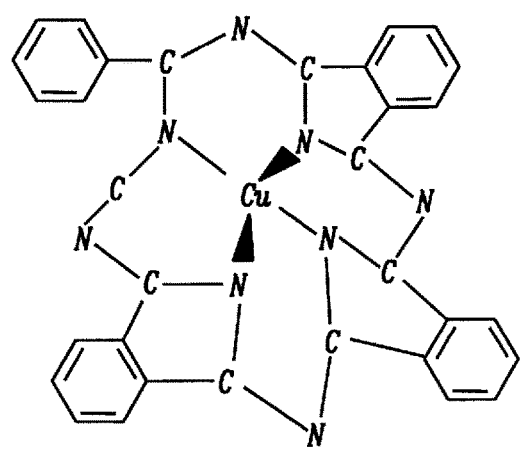
Blue dye
FIG. 10

HIGH RESOLUTION AND HIGH SENSITIVITY THREE-DIMENSIONAL (3D) CURSOR MANEUVERING REFERENCE PLANE, AND METHODS OF ITS MANUFACTURE

RELATED APPLICATIONS

This application claims the benefit of U.S. Provisional Application No. 61/845,533 filed on Jul. 12, 2013 which is herein incorporated by reference in its entirety.

This application is related to docket number NU11-009, Ser. No. 14/294,369, filed on Jun. 3, 2014 which is herein incorporated by reference in its entirety.

BACKGROUND

1. Technical Field

The present disclosure relates to a maneuvering system to be used for controlling or facilitating three-dimensional motion of a real or graphically rendered object on a computer, an electronic display or other electronic or electromechanical devices.

2. Description

FIGS. 1A and 1B show, schematically, the generic structure of a prior art two-dimensional (2D) optical mouse (101), which is a two-dimensional (2D) cursor maneuvering device. During its operation, the operator moves the mouse unit (e.g. from point A1 to A2) on a 2D desktop surface (106), hereinafter also referred to as a reference plane. By comparing a series of images captured from said desktop surface the conventional optical mouse (101) sends motion vectors to the remote computer, whose data format is also a 2D one, i.e., ($\Delta X$, $\Delta Y$). As FIG. 1C shows, a cursor (not shown) in the displaying device (107) would move from point B1 to B2 on the display as the mouse unit moved from A1 to A2 on the reference plane (106). As FIG. 1A further shows, during the course of the maneuvering action, the mouse unit (101) uses a light source (103) to illuminate an area (107) which is surrounded by a cavity (102) in the mouse, and pictures are taken of this area by an image sensor (105). When buttons (104) on the mouse are clicked, certain function(s) (e.g. file open, close, object select, etc.) can also be activated.

In recent years, the three-dimensional (3D) displaying device has become increasingly popular. Such a device can be used on the computer, video gaming device, global positioning system (GPS), etc. Despite its appealing claimed functionality, a state of art 3D displaying device suffers from one serious shortcoming, it does not interact directly with the conventional optical mouse, which is a 2D device. Specifically, there is no point to point relationship between the data processed by the mouse and by the displaying device. As a result of this shortcoming, many professional computer programs (e.g. AUTOCAD®, medical images utilities, etc.) face difficulties when used in a 3D environment. Quite simply, over the past few decades the technological progress of the cursor maneuvering device (i.e., the mouse) has not caught up with that of graphical rendering technology (e.g. flat panel display).

SUMMARY

It is an object of the present disclosure to provide an integrated 3D cursor maneuvering system comprising a mobile cursor maneuvering device and, most generally, a 2D planar or locally planar reference surface (sometimes referred to as simply a reference surface or a reference plane) on which to move the cursor maneuvering device so that, when operating together, the integrated system will provide full 3D cursor movement (or 3D control) for a computer or electronic system to use.

It is a further object of the present disclosure to provide such a system where, upon being maneuvered over the reference surface the mobile cursor maneuvering device is able to provide 3D address and motion vectors at high sensitivity and high resolution for the remote computer or electronic system to use (i.e. addresses (X, Y, Z) or motion vectors ($\Delta X$, $\Delta Y$, $\Delta Z$)).

It is yet an additional object of the present disclosure to provide such a reference surface in the form of a "tinted" reference surface, that is colored using dyes or pigments, so that each position on the reference surface may be uniquely associated by its color with an absolute location of the maneuvering device on the reference plane.

It is a further object of the present disclosure to provide such a tinted reference surface where the tinting process produces a color continuum that can be used to produce a high resolution and highly precise correlation between each point on the tinted reference surface and 3D position and motion vectors on a display or an electronic or electromechanical maneuvering device.

As FIG. 2A schematically shows, the integrated system meeting the objects set forth above comprises the reference surface (206) and the cursor maneuvering device (203) that moves over it. As FIG. 2A further shows, light source (207), contained within cavity (202) of the maneuvering device, causes multiple light beams (i.e. 209) to impinge onto the reference plane (206). Note that the "cavity" may be some more general enclosure or surrounding region that encircles or surrounds the light source. The reference plane (206) has been "tinted" by coloring materials (e.g. dyes, pigments, etc.). Light beams (213), (214) and (215) represent possible reflected beams, having different color tonal values, resulting from impinging beams (209). These reflected beams would be captured and analyzed by color sensitive photoreceptor (205).

FIG. 2B schematically shows the tinted reference surface (206), which we will assume is tinted in an exemplary manner that can be described by the CIE 1931 RGB color index. The tinting condition of the reference plane (206) varies in a continuous tonal manner along the surface of the reference plane; i.e. the assumed CIE 1931 RGB color index value changes in a continuous manner. For example, as FIG. 2B further shows, the microscopic image of the central region (208) of reference plane (206) may appear like that of (211). Here, we have used a pattern of black and white dots to schematically represent a variation of color tone intensities. On the other hand, the microscopic image of the peripheral region (212) may appear like that of (210). Comparing the two images, one will note that the color index values of the coloring materials in said two areas will be different. The prior art optical mouse can already easily take thousands of image frames in one second. A color sensitive photoreceptor (e.g. CMOS, CCD, etc.) can easily differentiate millions of different colors. So, a high sensitivity to hue difference data relating to the color index values of the two image frames (e.g., (210) and (211)) can be calculated (e.g. CIE 1931 RGB, Lab, etc.). By converting the color index data into 3D positional data, the hue values (i.e. color index data) of reference surface (206) can serve as an ideal data source for 3D cursor maneuvering use. Table 1 (below) shows the correlation between the intensity ($I_{213}$, $I_{214}$, $I_{215}$) of light detected by the photoreceptor and the position of cursor (X, Y, Z) on the displaying device ($I_{213}$, $I_{214}$, and $I_{215}$ denote the intensity of light beams 213, 214, and 215 in FIG. 2A). When the 3D cursor maneuvering device moves in a time interval between $t_1$ and $t_2$, the intensity of light detected by the photoreceptor (205) changes from ($I_{(213, t1)}$, $I_{(214, t1)}$, $I_{(215, t1)}$) to ($I_{(213, t2)}$, $I_{(214, t2)}$, $I_{(215, t2)}$). This symbolically denotes the phenomenon that the color index has changed. By mathematical conversion, the corresponding 3D positional data can be derived, and they will change from ($X(t_1)$, $Y(t_1)$, $Z(t_1)$) to ($X(t_2)$, $Y(t_2)$, $Z(t_2)$). Note that light source (207) and photoreceptor (205) are enclosed by a "dark room" which is constructed by cavity (202) and the portion of the reference plane (206) beneath the cavity. Such a "dark room" environment is able to block off the ambient light, making the intensity of light beams 213, 214, and 215 in FIG. 2A free from interference by the stray light from the ambient. Hence, ($I_{(213, t1)}$, $I_{(214, t1)}$, $I_{(215, t1)}$) and ($I_{(213, t2)}$, $I_{(214, t2)}$, $I_{(215, t2)}$) will not be subjected to the interference of noise (i.e. $I_{noise}$), and, as the consequence, ($X(t_1)$, $Y(t_1)$, $Z(t_1)$) and ($X(t_2)$, $Y(t_2)$, $Z(t_2)$) are very accurate, representing the positional displacement of cursor maneuvering device (203) well.

TABLE 1

|  | $I_{213}$ | $I_{214}$ | $I_{215}$ | X | Y | Z |
|---|---|---|---|---|---|---|
| $t_1$ | $I_{(213,t1)}$ | $I_{(214,t1)}$ | $I_{(215,t1)}$ | $X(t_1)$ | $Y(t_1)$ | $Z(t_1)$ |
| $t_2$ | $I_{(213,t2)}$ | $I_{(214,t2)}$ | $I_{(215,t2)}$ | $X(t_2)$ | $Y(t_2)$ | $Z(t_2)$ |

The above described method is a generic one. There are many evolutions and variations that can be derived from the same design rule, i.e., by tinting a 2D reference plane (e.g. 206), either physically, chemically, mechanically, or by whatever means applicable, a cursor maneuvering device facing said tinted plane can work as a 3D one. To gather the most photons emitted from the tinted plane, a method of adjusting the color index value of the tinted plane is disclosed (i.e. embodiment 2), and a method of aligning the optical property (i.e. reflectance) of dyes to the sensitivity of photo receptor is also disclosed (i.e. embodiment 3). As to embodiment 1, it discloses a general method that uses various types of printers (e.g., thermal printers) available in the consumer market to manufacture cursor maneuvering reference plane suitable for the presently disclosed system and meeting its objects. The following paragraphs characterize the means of manufacturing the presently disclosed cursor maneuvering reference plane.

The state of the art color printer industry can be largely categorized by the following types of printers: (1) Inkjet printer, (2) Laser Printer, (3) Wax jet phase change printer, (4) Thermal wax transfer printer, and (5) Thermal dye transfer printer and (6) 3D printer. The printing device preferred by the presently disclosed cursor maneuvering reference plane is the thermal dye transfer printer (item 5), whose justification is provided in embodiment 1. There is a factor related to printer choice that will be explained below, "STFWHMR," which refers to "Signal to FWHM (Full Width Half Maximum) Ratio". In the conventional (prior art) optical mouse industry, the performance index of a product is often denoted by a factor called SQUAL (surface quality factor). The SQUAL factor, often stored as a register in the DSP (digital signal processor) of the mouse sensor, gives information about the limits to small surface variations (also called surface features) that can be used for motion measurement in the current image of the optical sensor. This register is an indication of the roughness (or relief) of the surface measured indirectly through the shadows enhanced by the lateral illumination applied. The SQUAL register has values from 0 to 169 in most practical cases; a high SQUAL value means that the image-processing algorithm used to detect motion will have more points to compare and the motion will be measured more accurately. The reading of the SQUAL register is compatible with the motion registers so sensor displacement and roughness can be read simultaneously.

Generally, SQUAL has to do with two physical reference surface qualities, spectral reflectance, and surface roughness. In the present disclosure, the performance index of a "tint mouse" (i.e., a color sensitive optical mouse) will be referred to by another factor, i.e. STFWHMR, which stands for "Signal To FWHM (Full Width Half Maximum) Ratio". In the presently disclosed invention, the formula of calculating said STFWHMR value is provided in embodiment 3. Using the STFWHMR parameter, a device engineer is able to characterize various kinds of printing technologies, i.e., from printer to dye, etc.

Embodiments 2 and 3 disclose two methods of manufacture having to do with a nanometer scale thin film deposition process. The respective STFWHMR factors of embodiments 2 and 3 are generally of higher quality than that of embodiment 1. The technical solution provided by embodiment 1, though possibly of somewhat lower quality than those of embodiments 2 or 3, has the potential to offer a lower priced solution. This feature (i.e. low price) is still a factor of great importance to the computer mouse industry.

When the method of surface deposition for the presently disclosed cursor maneuvering reference plane is specified as thermal printing, the dye material will be of the RGB type. Today, most of the printers operate in CMYK (Cyan, Magenta, Yellow, and Key, which is Black) mode, but most of the digital image sensors are in RGB mode. A naïve attempt to use the conventional, low cost, household printer (e.g. an inkjet printer) to fabricate the present 3D cursor maneuvering reference plane may inadvertently cause tremendous troubles (e.g. resolution unstable, etc.). The ink/dye and the driver programs of the household printer are designed for the color saturation effect to human eyes, and for this reason state of art color printers are mostly designed based on CMYK color model. The optical phenomenon as perceived in the macroscopic world (e.g. a cluster of ink droplets being visualized at a cm scale distance) can be far different than that of microscopic world (e.g. a cluster of ink droplets being visualized in a nm scale distance). In a microscopic image of a portion of a substrate printed by a conventional household printer, the ink droplets are deposited as a speckle pattern, being randomly "spattered" on the substrate. By "juxtaposing" different colors (e.g. pigment, or dye molecules in CMYK color) in close proximity (in the case of thermal dye transfer printers, the juxtaposition is vertical), a CMYK mode ink system can simulate most colors at a "human eye" saturation level (note, not necessarily at high color fidelity level). On the other hand, discrepancies among different color modes may emerge when one looks into the ink droplets with a microscope. Modern digital image sensors (e.g. CMOS or CCD type, etc.) are perceptible to red, blue, and green color, but requiring a prompt response to a pigment in a color such as yellow, would make the color calibration tasks for such digital image sensors difficult. Thus, one must recognize the following fact: it is the color fidelity (i.e. what color is printed on the substrate rather than the color that is being detected by the sensor) that is the feature that matters most to the presently disclosed cursor maneuvering reference plane. Unfortunately, in the past this key feature of fidelity has been traded off for the color saturation effect by use of the conventional CMYK mode printer. To meet the objective of using color recognition for positioning cursors on the displaying device accurately and reliably, there are two available approaches:

(1) Align the sensitivity of photoreceptor to that of the dye in the cursor maneuvering reference surface.
(2) Align the sensitivity of dye in the cursor maneuvering reference surface to that of photoreceptor.

Embodiment 3 discloses the methods for achieving each of the above approaches. For example, the presently disclosed tinted reference surface would preferably use the dye/pigments in RGB mode when the photoreceptor is in RGB mode. This product designing strategy has not been disclosed by any prior art before (state of art computer mice are color blind).

In embodiment 2, a dyed sol-gel deposition process (i.e. dye material can be mixed in the sol-gel solution as desired) is disclosed. The relative ratio of the coloring materials as is perceived by the photoreceptor is, therefore, carefully and precisely controlled by the thickness of the films deposited using the sol-gel deposition process (e.g. Spin coating, etc.). Because the sol-gel process can control the thickness of the film to nm accuracy, the cursor maneuvering tinted reference plane becomes a high resolution one.

When using a household inkjet printer to fabricate the 3D cursor maneuvering tinted reference plane, there is another technology barrier which has to do with the AM (Alternative Modulation) printing technique, which is a technology being adopted by most of the inkjet printers today. This problem can be explained by referring to schematic FIGS. 3A and 3B. FIG. 3A shows in schematic black and white the microscopic image (304) of a reference plane (206) printed by the conventional inkjet printer. As FIG. 3A shows, the ink material forms multiple speckles (i.e. 301, 302, 303, etc.) on the matrix (304). This is a typical phenomenon of AM printing process (used by most of the inkjet printers today). When looked at from distance of a few centimeters, the multiple speckles (often in μm size) appear to have been "coalesced", i.e., taken together they create an averaged grey value for the respective area. This effect tricks human eyes into believing that the tone of the speckled image plane is continuous. Unfortunately, these speckles will be identified by the optical mouse as discrete objects, since the optical mouse often uses a magnifying lens to observe the desktop surface. Hence, a reference plane fabricated by the household ink-jet printer can hardly be used as a continuous-tone surface in the eyes of an optical mouse. This issue poses a serious challenge for the conventional art (e.g. inkjet printer) if attempting to fabricate any high precision and high resolution cursor maneuvering reference plane. Microscopically, when the size of the ink speckles changes abruptly, the flux of light beams (i.e., (213), (214), (215) in FIG. 2A) reflected from the speckled area changes correspondingly and the color index values in the respective image frames fluctuate accordingly (e.g. grey value of a specific color, e.g. CIE 1931 RGB, etc.). A thermal sublimation process is disclosed in embodiment 1 as a solution to this problem, namely to deposit several dyes of different colors as a mixture on the reference plane, giving the reference plane a continuous-toned surface. In addition, embodiments 1 and 2 of the presently disclosed reference surface fabrication processes provide a method to fabricate a "linearly tinted, high color fidelity" surface through the use of nanometer scaled, continuous-toned dyes, etc.). The importance of using nanometer scale dye particles can be further explained by Eq. (1), which is an optical flow equation:

$$\frac{\partial I}{\partial x}v_x dt + \frac{\partial I}{\partial y}v_y dt + \frac{\partial I}{\partial t}dt + H.O.T = 0 \qquad (1)$$

Where I is the intensity of light impinging on a geographical point denoted by (x, y) on the image sensor, at instant t; $v_x$ denotes the velocity of a targeted object that is moved along they direction; $v_y$ denotes the velocity of a targeted object that is moved along the y direction;

$$\frac{\partial I}{\partial x}$$

denotes the variation of light intensity along the x direction;

$$\frac{\partial I}{\partial y}$$

denotes the variation of light intensity along the y direction;

$$\frac{\partial I}{\partial t}$$

denotes the variation of light intensity in a time interval ∂t; and H.O.T. stands for the high order term $$\left(e.g., \frac{\partial^2}{\partial t^2}\right).$$

In most image processing products that are found in consumer electronic market today, the motions of objects are associated with large entities observable by human eye (e.g. a mountain, car, or an actress on the stage, etc.). This is not the case for the optical mouse, which is dealing with microscopic objects at all times. In the microscopic world, small perturbations of the reference surface (e.g., distribution of dye particle size, variation of refractive index, different facet orientations of crystalline materials, etc.) will affect the non-linear term, i.e. H.O.T., of Eq. (1) substantially. Hence, the term H.O.T. is in fact a lumped term composed of many optical artifacts—some of which are beneficial to non-linear motion detection, some of which are not. For example, using nanometer sized dye particles to cover the surface of substrate matrix may suppress occurance of spurious spikes of colorations caused by the substrate matrix, which would have been detected by a color image sensor as noise. Still further, when nanometer sized dye particles are deposited on the substrate following a predefined gradient profile (e.g., lightly tinted to heavily tinted along a specific direction), the entire cursor maneuvering system will be more sensitive to certain non-linear motions (e.g. rotations, etc.), which makes the present cursor maneuvering system a high sensitivity and high resolution hand gesture sensing device, ideal for use in 3D cursor maneuvering applications. Still to be noted is the adaptability of the presently disclosed tinted reference surface for use by conventional 2D optical mice. In conventional art, especially the gaming mouse, a mouse pad is preferred to be used because the SQUAL value can be intentionally increased by creating certain surface roughness condition (e.g. a rubber pad, a fabric pad, etc.). There are some prior arts which may resort to imprinting "patterns" on the mouse pad, these "patterns" are usually associated with some graphic art rendering effects, designed mainly for aesthetic purposes. In an uncontrolled situation, some of these "patterned" pads may inadvertantly increase the SQUAL value, while some just as inadvertently do the opposite. Thus, it is really just a matter of the consumer's luck to achieve the sensitivity and resolution as the optical mouse/pad vendors have claimed. Fundamentally, prior art devices, whether 2D or 3D ones, have not provided any comprehensive means to increase/control the sensitivity of the mouse unit, let alone the non-linear devices (most prior arts may resort to increasing frame rate when the result is not satisfactory). The present system sends a clear message, it is the geographical distribution and arrangement of the microscopic dye particles on the substrate that has much to do with final sensitivity and resolution of a 2D or 3D cursor maneuvering device (i.e. the case of related application NU11-006 which is a 2D optical mouse, or NU11-007 which is a 3D optical mouse or 2D optical mouse with cursor rotating ability).

As already briefly mentioned, in the optical mouse industry, the performance index factor, SQUAL (surface quality factor), is related to two physical aspects of a surface, its spectral reflectance, and its surface roughness. Embodiment 1 is mostly focused on the first aspect, i.e. spectral reflectance. Embodiments 2 and 3 address the second aspect, surface roughness.

When taking microscopic pictures of, for example, a paper surface imprinted with colorful dyes/inks, not only the dye speckles, but also surface morphology of the paper comes into play. Hence, the above stated problem (unstable data caused by the ink speckles) will be exacerbated by the surface morphology (e.g. SQUAL value). As FIG. 3B schematically shows, when light beams (314A), (315A), and (316A) impinge on reference plane (304), microscopic facets make the reflected beams go in different directions. In FIG. 3B, these reflected beams are denoted by arrows (314B), (315B), and (316B). This effect is simulated by equation (2).

$$R_t = R_0 \exp\left[-\frac{(4\pi\sigma)^2}{\lambda^2}\right] + R_0 \frac{2^5 \pi^4}{m^2}\left(\frac{\sigma}{\lambda}\right)^4 (\Delta\Theta)^2 \quad (2)$$

Here, $R_t$ is the total reflection, $R_0$ is the reflectivity of the surface coated with coloring material, m the mean gradient of slope, $\sigma$ is the root mean square of surface roughness, $\Theta$ is the solid angle of measurement. Note that the diffuse reflectance (i.e. a factor that changes per light scattering effect caused by surface morphology), which is the second term of (2), increases with roughness as $\sigma^4$. This denotes a serious problem in that microscopic roughness ($\sigma$) aggravates the problem of abrupt variations of reflectance values in area (301), (302), and (303) (i.e. the place where light beams 314A, 315A, and 316A impinge on). In the prior art which only uses a monochromatic light source and image sensor, surface roughness usually is a feature desired by the device engineer in that it increases the validity of BMA result (block matching algorithm). But the microscopic surface undulations may have the opposite effect on the presently disclosed tinted mouse, as it causes the reflected light to go in various directions. The net result is that the color index data as measured from a substrate with undulating morphology is subjected to the noise caused by the surface roughness. By reducing surface roughness, the present system thereby provides methods to address the non-uniform distribution of coloration in the microscopic scale, which is an issue not previously addressed by use of the conventional thermal sublimation printer because it was not designed for tinting microscopic objects. To fundamentally address the problem caused by the substrate morphology (e.g. roughness), one may deposit a layer of undercoat or overcoat materials (flat, rough, glossy, transparent, or translucent) before or after the dye layer(s) is(are) deposited onto the substrate. This method can be applied to either embodiment 1, 2, or 3. To re-iterate, the presently disclosed tinted reference surface can be used for 2D or 3D cursor maneuvering or other object position manipulating purposes. There is no limitation that the reference surface is to be used only for 3D applications.

In general, the methods associated with micro-tinting technique can be adopted by the dye material or substrate morphology adjusting process, or both. Process conditions of the dyes can cause another undesirable side effect—the color variation of the fiber itself in nanometer scaled world. Referring to FIG. 3C (an exemplary case), there is graphically shown the light scattering effect of a polymer fiber (polyester in this example, but it can be applied to the other kind of polymer materials as well) dyed by different pre-treatment processes. The effect varies by different processes. Curve A denotes the K/S (K/S is called color strength value; the physical meaning of K has to do with light absorption, whereas S has to do with light scattering effect) spectrum of a dyed polymer surface which has been treated by a base solution as the pretreatment process. Curve B denotes the K/S spectrum of a dyed polymer being treated by a plasma cleaning process. Curve C denotes the value of scattering vs. absorption (K/S value) of a dyed polymer (e.g. polyester) receiving no pretreatment process. Lastly, Curve D denotes the K/S value of the same dyed polymer being treated by an acetic solution as the pretreatment process. It is to be noted that the apparent color (wavelengths) of the above dyed polymers (expressed in nanometers) will be changed when the K/S value changes. When a surface as stated above is taken pictures by a color sensitive mouse, this effect will be manifested in that the variation of K/S will affect the color index value noticeably. This situation, of course, is not desired.

In the discussion of the embodiments, each method disclosed is developed for solving a specific aspect of the above stated problems; they all allow for a cursor maneuvering device to generate 3D positional data in high sensitivity and high resolution mode.

The following references can be consulted for further general discussion of the material on color reproduction using printers of the type that were briefly described above.
Li Yang, "INK-PAPER INTERACTION, A study in ink-jet color reproduction", Linköping Studies in Science and Technology Dissertations No. 806., ISBN 91-7373-613-9 ISSN 0345-7524, Printed in Sweden by UniTryck, Linköping, 2003.
Roy S. Berns, "PRINCIPLES of COLOR TECHNOLOGY, $3^{rd}$. Ed.", John Wiley and Sons, Inc., 2000, ISBN 0-471-19459-x

BRIEF DESCRIPTION OF THE DRAWINGS

FIGS. 6A1, 6B1, 6C1, 6A2, 6B2, and 6C2 schematically depict the generic structure, and associated fabrication processes, of a high resolution 3D cursor maneuvering reference plane.

FIGS. 6D1, 6D2, 6D3, and 6D4 schematically depict the cross-sectional view of the stacked film comprising different coloration multi-layer architectures (i.e. 2, 3, and 4 layered, etc.)

FIG. 10 depicts the molecular structures of the dyes used by state of art LCD color filter industry.

DETAILED DESCRIPTION

The following three embodiments provide the fundamental principles, structure and corresponding methods of fabricating a tinted cursor reference plane and a mobile device associated with that plane that is used for moving on that plane and for sending data corresponding to that motion to a remote device. The mobile device and the reference plane, when operated as an integrated system, is able to meet the high sensitivity and high resolution challenges required by professional applications such as mechanical sketching, medical image manipulation, and 3D control of electronic or electromechanical devices. Hereafter, the phrase "cursor maneuvering" is understood to represent and summarize not simply the motion of a cursor on the screen of a remote device, but all of the 3D control mechanisms provided and made possible by this disclosure. Thus, when the motion of the mobile device on a 2D surface is converted to absolute position and motion in a 3D space, that 3D space representation can be used to move a cursor on a remote screen or it can be used to control a 3-dimensional printer or it can be used to control the motion of a vehicle. Note also that the terms "reference surface" and "reference plane" are used somewhat interchangeably. Typically the mobile device (think here of an optical mouse) moves along a flat surface, hence we would call it a "plane". However, we also envision the device moving across a curved surface that is locally planar, in which case the term "surface" might be more applicable. The essence of the method is to map 2D planar motion into 3D motion, for either control or representation purposes. We emphasize that the term "tinted" is used quite generally to refer to surface treatments that can encode information to determine an absolute position on a reference surface. The encoding can use dyes and pigments, reflections, absorptions, interference, etc., all of which affect the properties of electromagnetic radiation in a way that the mobile device can detect, analyze and convert to an absolute position and a mapping to a 3D space. Further, the principles and methods outlined below for creating the reference surface/plane are not just those associated with the use of a household printer. Instead, using a variety of methods, they aim at fabricating a high fidelity coloration plane that is continuous up to the microscopic scale.

Figure 2A:
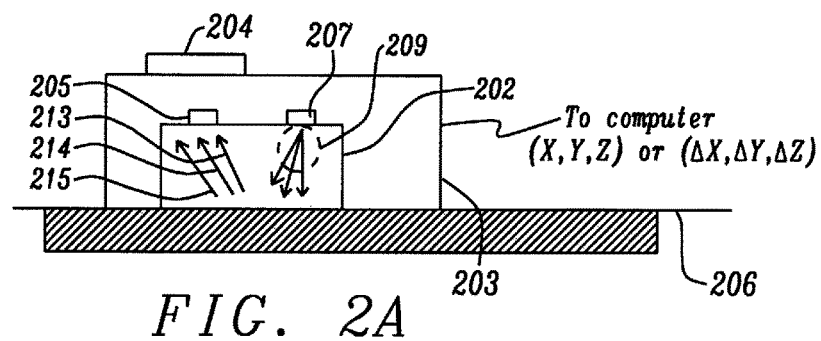
FIG. 2A shows a 3D cursor maneuvering device positioned over the presently disclosed tinted reference plane, where positional data in 3D format is generated when said cursor maneuvering device now moves over the presently disclosed reference plane.

The presently disclosed cursor maneuvering reference plane provides a stable mechanical support for the 3D cursor maneuvering device (e.g. (203) of FIG. 2A) to be placed on. This mechanical support makes the reference plane immune from human body vibration. The conventional 3D motion trackers (e.g. magnetic tracker or optical tracker) cannot eliminate these problems. Hence, a 3D cursor maneuvering device used in conjunction with the presently disclosed 2D cursor maneuvering reference plane is able to provide 3D motion data with unprecedented sensitivity and resolution.

Embodiment 1

Embodiment 1 discloses a 3D cursor maneuvering system, including a mobile device and a 2D reference plane (or surface that is a plane or is locally planar) which, acting together, is able to provide 3D positional and motional data in an absolute manner (contrary to the relative motion vectors used by prior art). The structure of the system and, more specifically, the method of manufacturing the presently disclosed cursor maneuvering reference plane is disclosed by referring to the schematic illustrations in FIGS. 4A, 4B, 5A, 5B, and 5C, which will be elaborated on below.

The conventional optical mouse only provides motion vectors in a relative mode; the absolute whereabouts of the mouse unit is unknown, only its motion relative to some (initial, but unknown in an absolute sense) position can be determined. A cursor maneuvering device knowing its whereabouts in absolute terms provides extraordinary advantages; it not only provides 3D motion data at high speed, but is also extraordinarily sensitive and responsive to subtle hand gestures or rotational movement. The virtues of a system that knows its absolute position are expressed more fully in related patent application NU11-009, assigned to the present assignee and fully incorporated herein by reference.

Figure 4A:
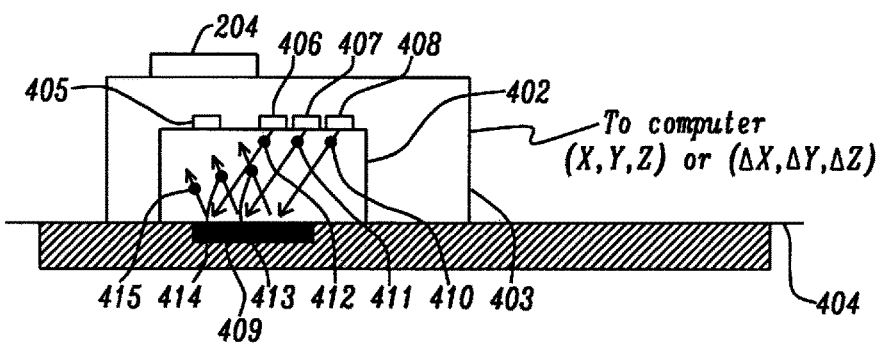
FIG. 4A schematically shows the interaction between of a 3D cursor maneuvering device and the presently disclosed tinted reference plane, during which multiple light beams in different wavelengths are reflected back from the reference plane and serve as the original data to produce the 3D cursor maneuvering action.

We refer now to a mobile, cursor maneuvering device (403) illustrated in schematic FIG. 4A, having multiple light sources (406, 407, and 408) that emit light beams in different wavelengths onto the reference plane (or surface) (404). A photoreceptor (405), mounted in cavity (402), captures a series of signals from a small region of a targeted area (409) on the reference plane (404). Physically speaking, these signals are a mixture of multiple light beams in different wavelengths, most of which are emitted from reference plane (404) by reflection. When the maneuvering device (403) moves over the reference plane (404), the color index it measures varies in accordance with the different amounts of dye deposited on the surface.

To derive 3D motion data, the photoreceptor (405) is designed in a way that enables it to capture signals related to each kind of light beam (i.e. the intensity of light in different wavelengths) in one data acquisition cycle (e.g. controlled by one clock signal). For example, in one data acquisition cycle, the photoreceptor (405) is able to measure the intensity of red, blue, and green light concurrently. For simplicity of the present description, the number of signals detectable by the photoreceptor (405) is set to be three in the present disclosure. But in fact this number can vary per application requirements.

When the hue of the reference plane (404) is constituted of three colors (i.e. three light sources, each emitting light in different wavelength), the cursor maneuvering device (403) is able to generate 3D positional or motional parameters (e.g. (X, Y, Z) or (ΔX, ΔY, ΔZ)) at one time. Mathematically, a process of converting the color index data measured into 3D positional data must still occur. Thus, the fundamental result of the present disclosure is that when the disclosed cursor maneuvering device (403) moves on the associated disclosed tinted reference plane (404), absolute 3D positional data (i.e. (X, Y, Z)) of the device is generated as its position changes from place to place. This is attributed to the interaction (e.g. absorption, reflection, scattering, fluorescence, etc.) between the light beams impinging on (410, 411, 412) and emitted by (413, 414, 415) the reference plane (404). Methods of adjusting this hue data are disclosed in embodiment 1, 2, and 3.

Figure 2B:
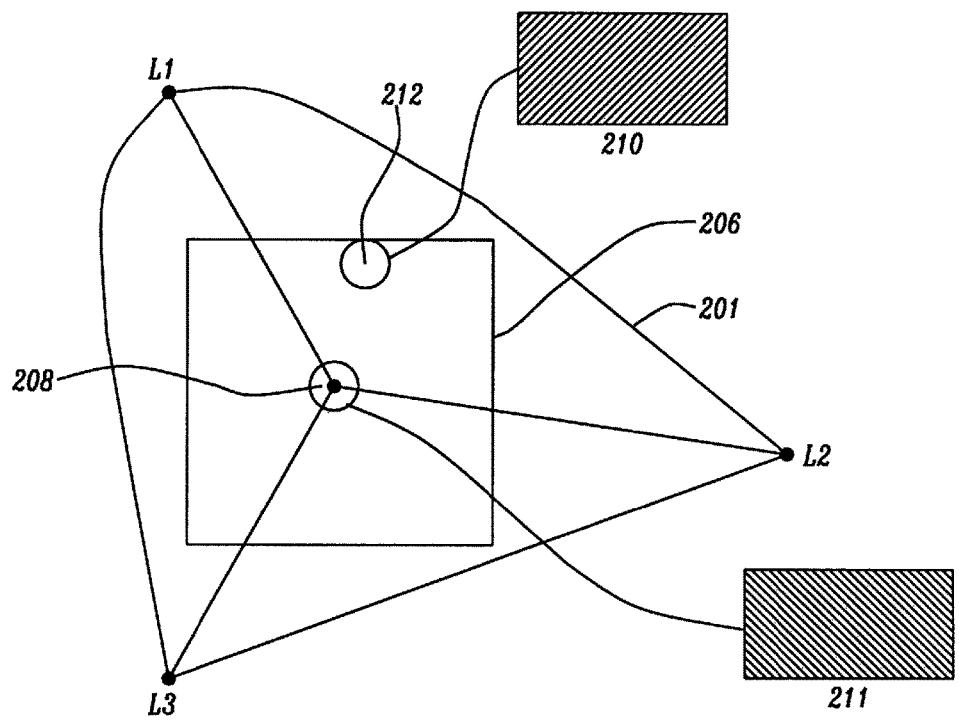
FIG. 2B shows an exemplary color gamut generated by the presently disclosed reference plane.

Measuring 2D motion vector data from a 2D reference plane by pattern recognition technique is well known in the prior art. The acquisition of 3D motion data from a 2D reference plane (404), has not been disclosed by any prior art before. For example, when the surface of reference plane (404) is dyed or otherwise colored by three coloration materials or their equivalent and the relative concentration of each dye varies from place to place, then the entire surface of reference plane (404) will appear as a color gamut ((201) in FIG. 2B). Thus, the cursor maneuvering device (403) is able to measure the color index value (e.g. CIE 1931 RGB) of the reference plane (404) and convert the color index value measured into a 3D positional data (e.g. (X, Y, Z)). Comparing the performance of presently disclosed system to such conventional 3D motion detection technologies as the magnetic tracker or optical tracker, the presently disclosed cursor maneuvering system is more immune from human body vibration, which the handheld magnetic tracker suffers from. The presently disclosed system is also immune from the interference of stray electromagnetic (EM) waves (both magnetic and optical trackers suffer from this) in that the targeted area (409) and the photoreceptor (405) are enclosed in the same, shielded dark room (i.e. cavity 402). This unique trait strengthens the performance of the presently disclosed mobile device (i.e. 403) so that its use in the integrated system (i.e. cursor maneuvering device (403) and reference plane (404)) becomes a 3D motion detection product with unprecedented capabilities of reliability and precision.

With respect to ergonomics, the presently disclosed invention also bears unprecedented advantages over the conventional art in that it will not exhaust the operator easily, which the magnetic trackers, optical trackers, or 3D goggles can do.

In yet a further attempt to make the presently disclosed tinted reference plane (404) an extremely high sensitivity and high resolution one, the reference plane (404) can be fabricated using nanometer-scaled dye/pigment. This allows the reference plane (404) to have a continuous tone on the microscopic scale, versus the continuous tone only on the macroscopic scale. When the presently disclosed 3D cursor maneuvering device (403) moves on such kind of plane, the variation of the color index data becomes continuous, the entire process of generating 3D motion vectors, therefore, becomes even smoother and more accurate than would a 3D cursor maneuvering reference plane fabricated using conventional coarse sized dyes. The following depicts a manufacturing process of said 3D cursor maneuvering reference plane (404).

Figure 4B:
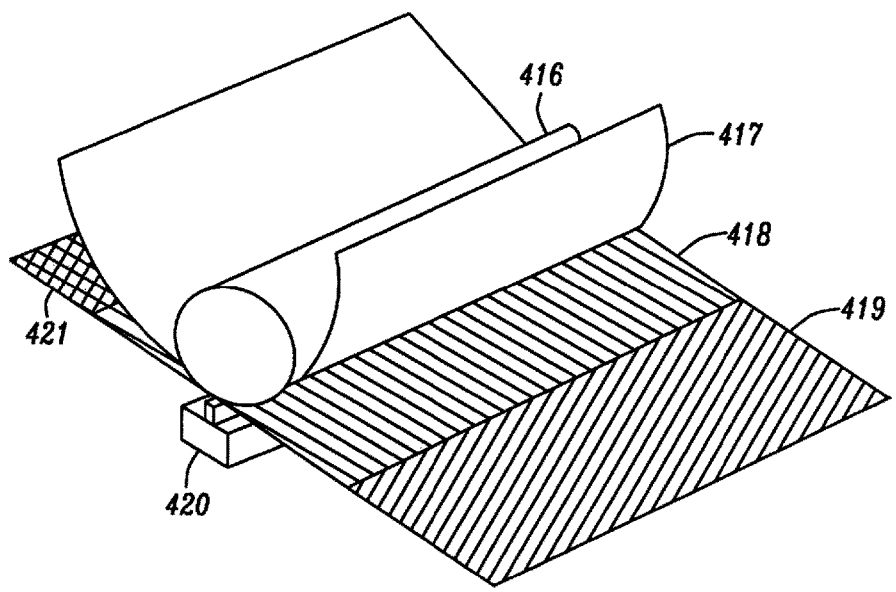
FIG. 4B depicts a low cost method of fabricating the presently disclosed cursor maneuvering reference plane, thermal printing technology, using consumer electronic grade printers.

Referring to schematic FIG. 4B, there is shown a thermal printer used for manufacturing the presently disclosed cursor maneuvering reference plane (404). This is still a low speed process. During the coating process, the roller (416) moves the substrate (417) (e.g. paper, plastic sheet, etc.) over a heating element (420). This heats the dye ribbons (418, 419, and 421). By adjusting the heat flux sent into the respective ribbon, a continuous-toned cursor maneuvering reference sheet (417) is manufactured.

Figure 5A:
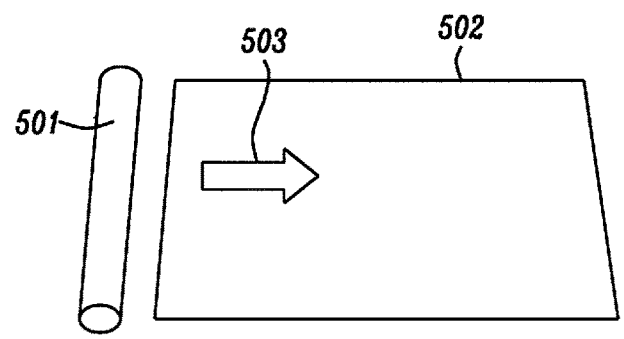
FIGS. 5A, 5B, and 5C schematically depict an industrial manufacturing method of fabricating the presently disclosed cursor maneuvering reference plane, a sequential thermal printing process.
Figure 5B:
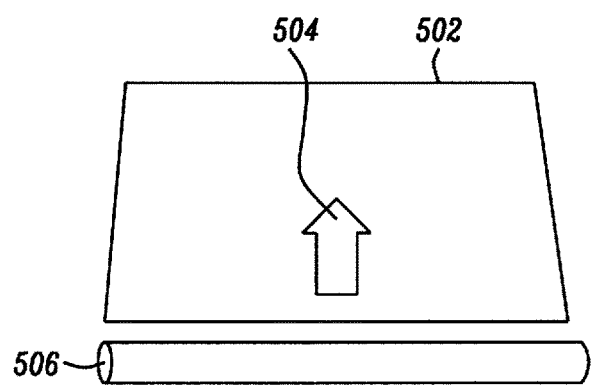
Figure 5C:
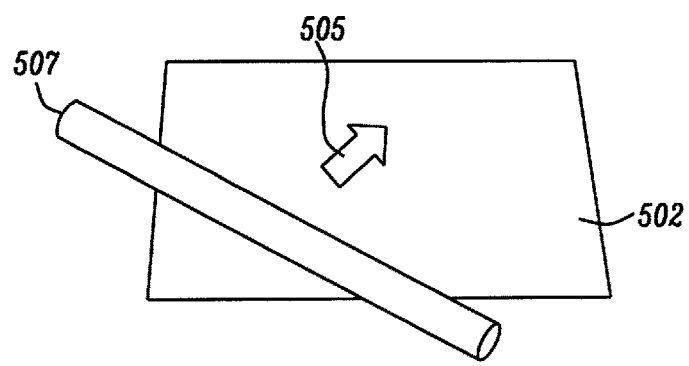

Referring to schematic FIGS. 5A, 5B, and 5C, there is shown another exemplary process of tinting the presently disclosed reference plane (502) using three dyes (i.e. 501 in FIG. 5A, 506 in FIG. 5B, and 507 in FIG. 5C). Each dye undergoes a unique deposition process along a specific direction (i.e. arrows 503 in FIG. 5A, 504 in FIG. 5B, and 505 in FIG. 5C). If these three deposition processes are placed in a sequential mode, the manufacturing capacity represented by the processes of FIGS. 5A, B, and C will be much larger than that of the process illustrated schematically in FIG. 4B. Again, the typical way of depositing the dye materials onto substrate (502) is, but is not limited to, a thermal dye transferring process (more specifically, thermal sublimation process). During such a thermal dye transferring process, the dye molecules (or other materials or substances producing the same or equivalent coloring effect) are sublimed (or produced by changes of state initiated by certain thermo-chemical or physical processes) from their respective sources (i.e. 501, 506, and 507 in FIGS. 5A, 5B and 5C respectively). After passing through a gap between those dye sources and the substrate, the dye molecules are deposited on the substrate (502). To adjust the "hue" value, the amount of thermal energy sent to each dye source can be adjusted for a unit time. When the heat flux sent into the dye source changes during the course of substrate advancement, the dye molecules form a gradient profile on the substrate (502), making the finished surface looked like a continuous-toned photography paper. This unique trait of thermal dye transferring printer is different from that of a conventional inkjet printer in that the surface formed by said dyes is continuously toned, whereas the surface formed by the inkjet printer is spattered on as a plurality of ink droplets. Thus there is no such continuous profile of the color index within the microscopic view of a reference plane fabricated by the inkjet printing process.

If the dye heating process can be controlled with sensitivity (e.g. by use of a high precision current source for electrical heater, etc.), then the presently disclosed thermal dye transferring process will form a reference plane whose "tint", or color, variation is distributed in a linearly continuous mode. This allows the cursor maneuvering device (e.g. 403 of FIG. 4A) to derive motion data at substantially high accuracy, without suffering from any abrupt changes of coloration. This feature (i.e. dyed surface by linearly changing coloring profile) significantly buttresses the effectiveness of the presently disclosed maneuvering system.

Embodiment 2

Embodiment 2, as compared to embodiment 1, discloses an extremely high resolution 3D cursor maneuvering reference plane, whose resolution (e.g. pixels/mm) can be far higher than that of embodiment 1. This resolution is obtained by using the dye thermal transfer printing process. Specifically, embodiment 2 not only addresses the coloration properties of dyes, but also the interactions between the dyes and matrix materials (e.g. polymer fiber, or composite material) used as substrates. The absorption and scattering effects of the presently disclosed cursor maneuvering plane are controlled by the thickness of the respective coloration layers.

Figure 1A:
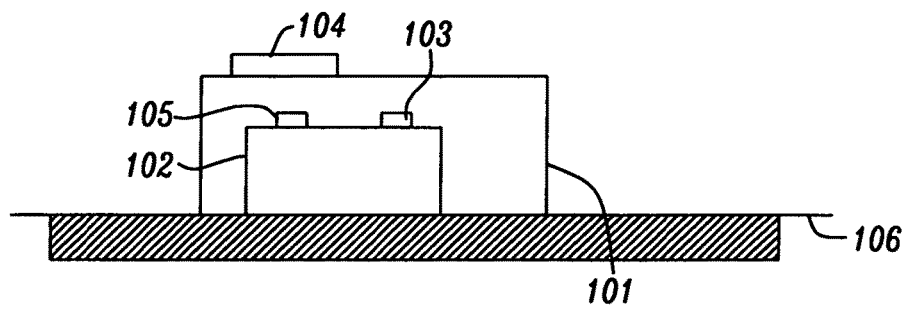
FIG. 1A depicts, in schematic cross-section the generic structure of conventional prior art cursor maneuvering device.
Figure 1B:
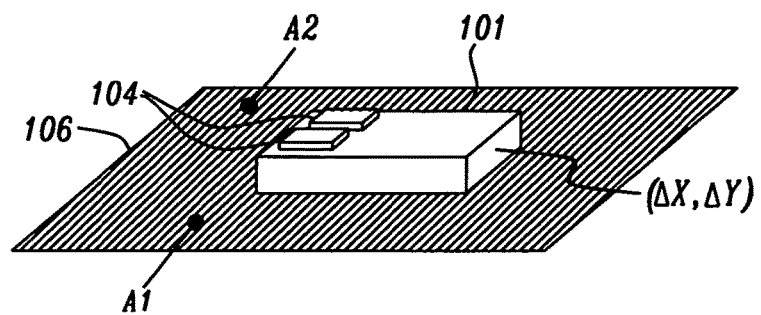
FIG. 1B depicts, in a schematic isometric drawing, the maneuvering act of the conventional cursor maneuvering device of FIG. 1A on a desktop surface, which is 2D reference plane.
Figure 1C:
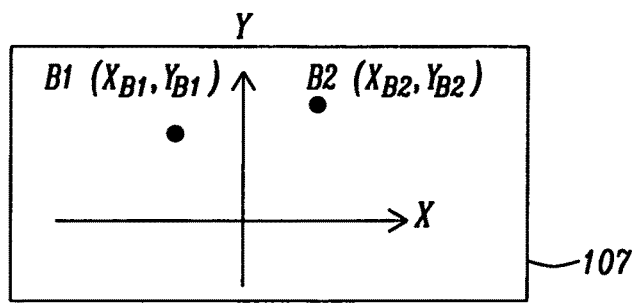
FIG. 1C schematically depicts the motion of a cursor in a displaying device corresponding to the maneuvering action of FIG. 1B.

Referring now to schematic FIGS. 6A1&2, 6B1&2, and 6C1&2, there is shown a reference plane material (shown from above as a square (604), in 6A2, 6B2 and 6C2) that is formed by depositing three translucent (or, in alternatively, semi-transparent) coloring layers which are will be stacked (layered) one over another (i.e. 601, 605, and 612, in FIGS. 6A1&2, 6B1&2 and 6C1&2 respectively). At the end of the layering processes for each of the three layers, each layer will have a linearly sloping thickness profile. An exemplary case is using polyester or Sol-Gel, each of which has a sloped profile of thickness along a pre-defined direction (e.g. X, Y, and Z axis as shown above the separate figures). FIG. 6A2 shows the sloped thickness profile of layer (601) along X axis direction (e.g. from (X=0, Y=0, Z=0) to (X=W, Y=0, Z=0). Normally, W is in the range of a few centimeters to tens of centimeters, but other ranges may still be applicable. In further detail, as FIG. 6A1 shows, layer (601) changes its thickness from 0 to d1 when the X axis address data changes from 0 to W. What is to be noted is that thickness of layer (601) is not changed along the direction of Y axis when the X-axis value is fixed. Hence, when the X-axis address of a point on reference plane (604) is set at a specific value, all points along the line parallel to the Y axis have the same thickness of layer (601).

Referring now to FIG. 6B2, layer (605) is deposited over substrate (604) in the same manner as that of layer (601). That is, the thickness of layer (605) changes from 0 at point (X=0, Y=0, Z=0) to d2 at point (X=0, Y=L, Z=0). In further detail, as FIG. 6B1 shows, layer (605) changes its thickness from 0 to d2 when the Y axis address data changes from 0 to L. Normally, L is in the range of a few centimeters to tens of centimeters, but other ranges may still be applicable. Likewise, the thickness of layer (605) is maintained at a constant value along the X direction (that is, for all points along a line parallel to X axis, the thickness of layer (605) is maintained constant). Note that what FIG. 6B1 reveals is merely a single layer process. When layer (605) is deposited over layer (601), the resultant double layer structure will appear, schematically, like the illustration in FIG. 6D2. When layer (605) is inserted between layer (601) and (612), the finished three-layer structure would resemble those of schematic FIGS. 6D3 and 6D4.

Referring now back to FIG. 6C2, layer (612) is deposited over substrate (604) in a manner different than that of layer (601) or (605). Specifically, the thickness of layer (612) changes along Z-axis, and this Z-axis is in fact an axis that lies diagonally on the X-Y plane, with its origin intersecting with the other two axes on point (0, 0, 0). For the Z-axis, we specify that the thickness of layer (612) reaches its maximal value of d3 at point (0, 0, 0). Like the design rules of layer (601) and (605), the thickness of layer (612) decreases from d3 to zero in a linear manner when the Z-axis value increases from 0 to D. In further detail, as FIG. 6C1 shows, layer (612) changes its thickness from 0 to d1 when the Z axis address data changes from 0 to D. Normally, D is in the range of a few centimeters to tens of centimeters, but other ranges may also be applicable. Note also that, depending on the layer deposition method(s) used (e.g. Sol-Gel, or Chemical Vapor Deposition, etc.), the thickness of layer (612) is maintained at a constant value for all points lying on an arbitrary line perpendicular to the Z axis. Note also that there are two parameters in FIG. 6C1 that don't have the fixed values (i.e. X*, Y*). In this case, the Z-axis is placed substantially diagonally on the X-Y plane (i.e. about 45° to the X Axis). There can be other cases in which the Z-axis is placed on the X-Y plane at another angle with the X-Axis, e.g. 30°. For this reason, we use (X*, Y*) in FIG. 6C1 to denote this possible situation.

When the above design rules are applied on all three layers (i.e. 601, 605, and 612), the thickness of each layer (i.e. layer 601, 605, or 612) fulfills equations (3), (4) and (5):

$$T_{601}(X) = \frac{X}{W}d1 \quad (3)$$

$$T_{605}(Y) = \frac{Y}{L}d2 \quad (4)$$

$$T_{612}(Z) = \frac{(D-Z)}{D}d3 \quad (5)$$

FIG. 6D1 demonstrates the above equations graphically. For an arbitrarily selected region (611) on reference plane (604), the total thickness of all layers deposited thereon is the sum of each one, i.e., (601), (605), and (612), etc. i.e., $$T_{total} = T_{601}(X) + T_{605}(Y) + T_{612}(Z) \quad (6)$$

where $T_{total}$ is the total thickness of each layer in region (611).

Note that $T_{total}$ may not be a constant $$\left(\text{i.e. } \frac{\partial T_{total}}{\partial X} \neq 0, \frac{\partial T_{total}}{\partial Y} \neq 0, \text{ or } \frac{\partial T_{total}}{\partial Z} \neq 0\right)$$

after the deposition processes of layer (601), (605), and (612) are finished. This phenomenon denotes a situation where the distance between the cursor maneuvering reference plane ((404) in FIG. 4A) and photoreceptor ((405) in FIG. 4A) is not constant (e.g. in-flux of photons to photo receptor may change due to this effect). This situation usually will not cause severe problems for the color index measurement process. However, if such a problem is too great to be ignored, then the device engineer can deposit an undercoating layer or over-coating layer to compensate for the gradient profile of $T_{total}$, i.e., $$\left(\frac{\partial T_{undercoat}}{\partial X} = -\frac{\partial T_{total}}{\partial X}, \frac{\partial T_{undercoat}}{\partial Y} = -\frac{\partial T_{total}}{\partial Y},\right.$$
$$\text{or } \frac{\partial T_{undercoat}}{\partial Z} = -\frac{\partial T_{total}}{\partial Z}; \frac{\partial T_{overcoat}}{\partial X} = -\frac{\partial T_{total}}{\partial X},$$
$$\left.\frac{\partial T_{overcoat}}{\partial Y} = -\frac{\partial T_{total}}{\partial Y}, \text{ or } \frac{\partial T_{ovrecoat}}{\partial Z} = -\frac{\partial T_{total}}{\partial Z}, \text{etc.}\right)$$

A few exemplary cases associated with the use of under or over-coating layer(s) are shown schematically in FIGS. 6D2 through 6D4. Within each coloration layer (i.e. 601, 605, and 612), according to Kubelka-Munk theory, the photon flux first enters from the above. During the course of light wave propagation through the layers, a portion of photon flux will be absorbed, the remaining portion will be scattered, finally either going backward into the ambient, or entering into the next lower layer. Thus, the intensity of light reflected back into the ambient can be described by differential equations, i.e., (7) and (8). Here we are using Kubelka-Munk theory, which assumes several conditions, i.e.: (1) dye is uniformly distributed in X, Y, and Z direction, no interface exists; (2) light enters downwardly from the direction normal to a substantially large X-Y plane; (3) the scattering effect is uniform in medium. Then the effective reflectance ($R_\infty$) can be expressed by (9).

$$\frac{dI_{down}}{dz} = +(s+k)I_{down} + sI_{up} \quad (7)$$

$$\frac{dI_{up}}{dz} = -(s+k)I_{up} + sI_{down} \quad (8)$$

$$R_\infty = 1 + \frac{k}{s} - \sqrt{\left(\frac{k}{s}\right)^2 + 2\frac{k}{s}} \quad (9)$$

Where $I_{down}$ is the intensity of light going downward, $I_{up}$ is the intensity of light going upward; s and k are called the K-M coefficients which are defined so that s has to do with scattering and k has to do with absorption, respectively. Note that the z direction used by (7) through (9) is associated with the direction normal to the X-Y plane. This z-direction is different from the Z-axis in FIGS. 6A1, A2, B1, B2, C1, C2, D1, D2, D3, and D4, where the Z axis lies in the X-Y plane. Thus, by controlling the absorption and scattering effect (i.e. by controlling the thickness of layer 601, 605, and 612), the device engineer is able to determine the amount of light reflected from an arbitrarily small area on the cursor maneuvering reference plane. This sets the fundamental rule of fabricating layer 601, 605, and 612, respectively.

When the thickness of layer 601, 605, or 612 changes, the intensity of light reflected from these layers to the photoreceptor changes accordingly (surface reflection is omitted in this case). Table 2 shows the correlation between the geographical position (X, Y, Z), reflectance value of each layer ($R_{601}$, $R_{605}$, and $R_{612}$), and the intensity ($I_1$, $I_2$, and $I_3$) of light detected by the photoreceptor in the respective wavelengths.

TABLE 2

| Address on the reference plane | | | Thickness of layer | | | Reflectance | | | Intensity of light | | |
|---|---|---|---|---|---|---|---|---|---|---|---|
| | | | $T_{601}$ | $T_{605}$ | $T_{612}$ | $R_{601}$ | $R_{605}$ | $R_{612}$ | $I_1$ | $I_2$ | $I_3$ |
| $X_1$ | $Y_1$ | $Z_1$ | $\frac{X_1}{W}d1$ | $\frac{Y_1}{L}d2$ | $\frac{D-Z_1}{D}d3$ | $R_{601,X1}$ | $R_{605,X1}$ | $R_{612,X1}$ | $I_1(X_1)$ | $I_2(Y_1)$ | $I_3(Z_1)$ |
| $X_2$ | $Y_2$ | $Z_2$ | $\frac{X_2}{W}d1$ | $\frac{Y_2}{L}d2$ | $\frac{D-Z_2}{D}d3$ | $R_{601,X2}$ | $R_{605,X2}$ | $R_{612,X2}$ | $I_1(X_2)$ | $I_2(Y_2)$ | $I_3(Z_2)$ |
| $X_3$ | $Y_3$ | $Z_3$ | $\frac{X_3}{W}d1$ | $\frac{Y_3}{L}d2$ | $\frac{D-Z_3}{D}d3$ | $R_{601,X3}$ | $R_{612,X3}$ | $R_{612,X3}$ | $I_1(X_3)$ | $I_2(Y_3)$ | $I_3(Z_3)$ |

The manufacturing method preferred for embodiment 2 is the spin coating process of dyed Sol-Gel. We note that other resinous or polymeric substances can be impregnated with dyes and pigments and used to form layers of the type to be discussed herein. The associated process is depicted schematically in FIG. 7, FIG. 8A, and FIG. 8B. Note that there can be other technologies, such as chemical vapor deposition, that are also suitable to the manufacturing process; the present embodiment 3 is not limited only to the Sol-Gel spin-coating process.

Figure 3A:
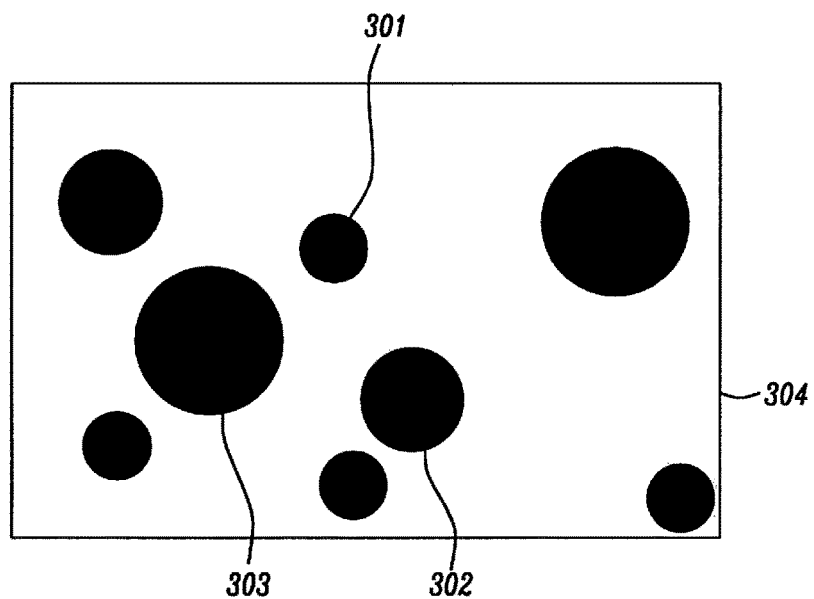
FIG. 3A shows ink droplets in a microscopic image.
Figure 3B:
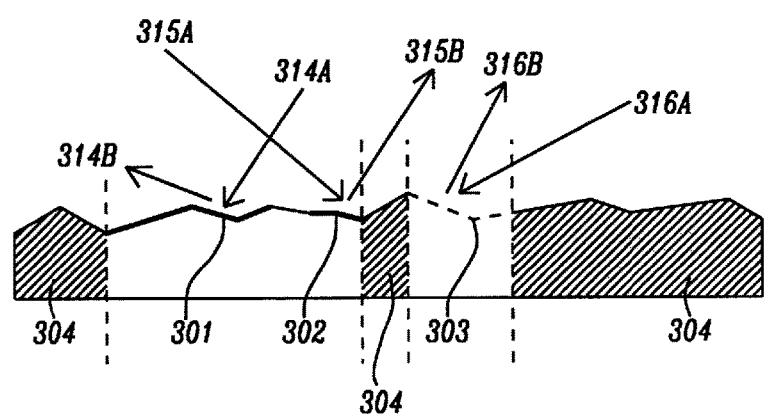
FIG. 3B shows the influences of substrate surface morphology to produce a light scattering effect in microscopic scale.
Figure 3C:
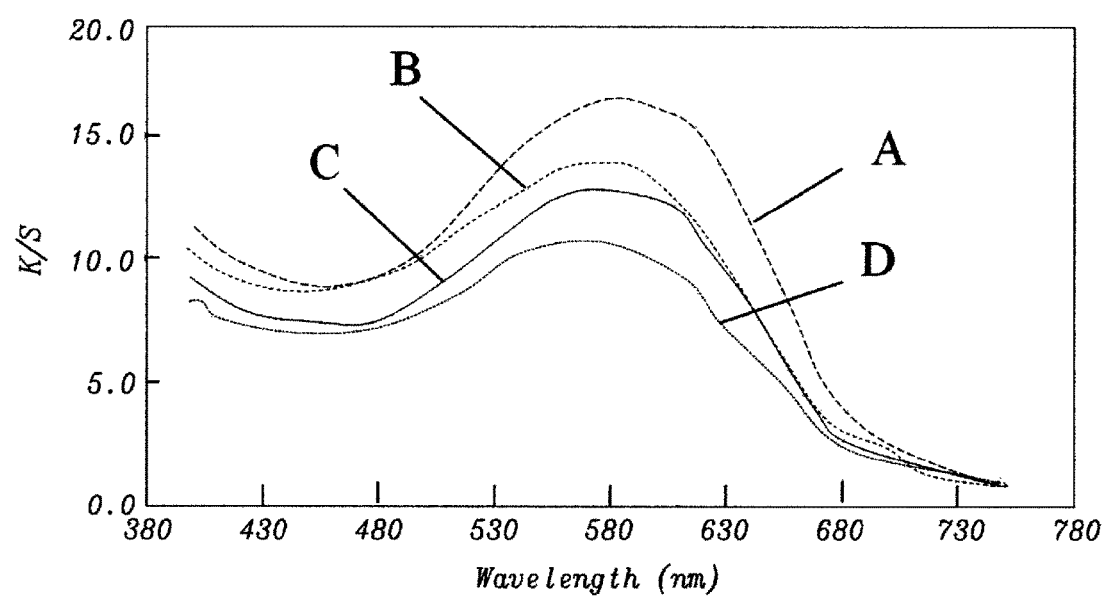
FIG. 3C shows the influences of processing condition to produce a light scattering effect in microscopic scale.

FIGS. 6D2, 6D3, and 6D4 show the layer structures which are associated with the presently disclosed tinted cursor-maneuvering reference plane. FIG. 6D2 depicts a bi-layered (i.e. 601B and 605B) cursor maneuvering reference plane. FIG. 6D3 depicts a quatro(four)-layered (i.e. layers 614, 612, 605, and 601, respectively) cursor maneuvering tinted reference plane, in which layer 614 is an undercoating layer. FIG. 6D3 depicts another kind of quatro-layered (i.e., from bottom to top, layers 612, 605, 601, and 613) cursor maneuvering reference plane, in which layer 613 is an overcoating layer. Note that FIG. 6D2 may only provide two parameters at one time (e.g. X, Y); the third positional data (i.e. Z) has to be derived by calculation. Alternatively, there are ways for an engineer to blend two kinds of dyes in one layer. Note that the top surface of layer 601 in FIG. 6D3 and that of 613 in FIG. 6D4 are now flat. In these situations, the distance between the cursor maneuvering reference plane (404) and photoreceptor (405) is constant throughout the entire cursor maneuvering reference surface (404).

Figure 7:
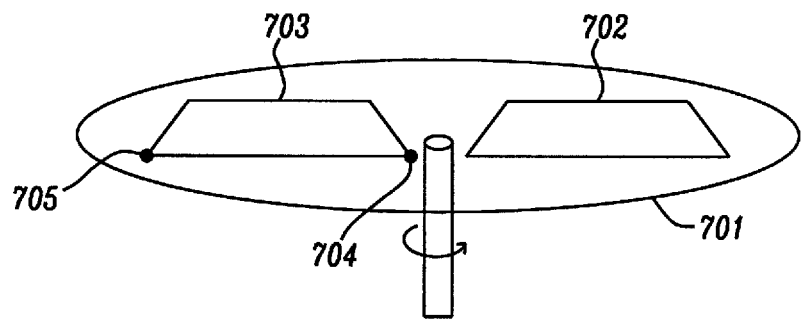
FIG. 7 schematically depicts the spin-on coating process used by the presently disclosed invention for forming the layer structure shown in FIGS. 6A1, 6B1, and 6C1.
Figure 8A:
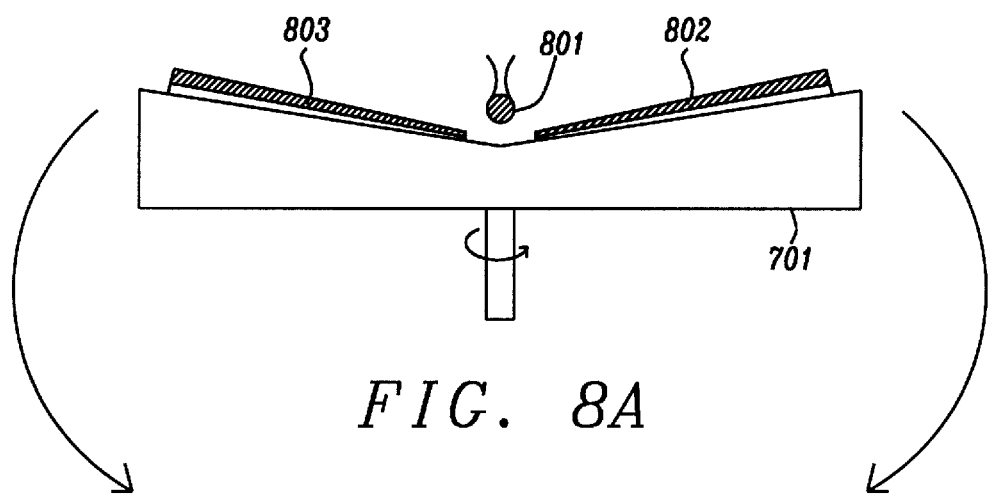
FIGS. 8A and 8B schematically depict the manufacturing method of depositing dyed Sol-Gel films on substrate.
Figure 8B:
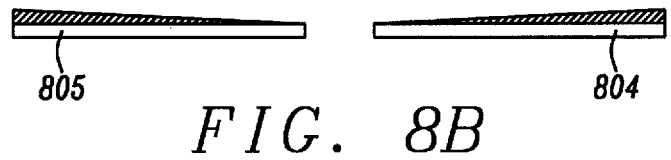

FIG. 7 schematically shows a spin coater (701) which is suitable for use to manufacture the tinted cursor maneuvering reference plane ((404) in FIG. 4A); in this case, it is being used with two substrates (702, 703). FIG. 8 schematically shows the spin coating process being used. When the spin coater (701) rotates at a predefined speed (e.g. hundreds revolutions per second), a Sol-Gel droplet (801) is dripped down at the center of the spinning table. Per centrifugal force, the Sol-Gel droplet will be pushed to the peripheral region of the spinning table of the coater (701). During the course of Sol-Gel droplet movement across the substrates, a thin layer of Sol-Gel (i.e. 802 and 803) will uniformly adhere to the surface of the substrate (702) and (703) mainly by strong van der Waal's force. As FIG. 8A further shows schematically, if there is an oblique angle to table (701), then the Sol-Gel film deposited on the substrates (702, 703) will have a profiled thickness. After curing process, an exemplary resultant variable thickness profile film structure is shown in (804) and (805). Of course, the slope of the profile is dependent on many factors, such as the viscosity of the Sol-Gel, the rotational speed of the table, the oblique angle of table surface, curing time of the solution and temperature. In the case of present embodiment 2, the device engineer may have to repeat the spin-coating process three times; each repeat being associated with a unique Sol-Gel dyed by different coloring materials. To make the profiled thickness of Sol-Gel along. X, Y, and Z directions as FIGS. 6A1, 6B1, and 6C1 show, the device engineer has to adjust the manner of placing substrate (702) and (703) on the spinning table (701). For example, in one process the device engineer may let the corner point (704) be placed closed to the central point; in another, the device engineer may let the corner point (705) be placed closed to the central point. Thus, stacked layers of sol-gel, dyed or pigmented with different colors, are formed.

There are other methods that can be used to form such a sequence of dye/pigmented layers. For example, a chemical vapor deposition process (CVD) can be used to form the stack layers. There are also other materials than sol-gel which are able to form the tinted substrate. For example, a state of the art 3D printer can also be used to form a crust of polymer materials dyed with a continuously toned coloring ingredient.

Embodiment 3

Embodiment 3 discloses an extremely high sensitivity 3D cursor maneuvering reference plane. The major difference between embodiments 2 and 3 is their choice of utility (i.e. resolution vs. sensitivity). Generally speaking, embodiment 2 has more to do with the resolution. The thickness profile of each coloring layer (i.e. 601, 605, and 612 in FIGS. 6A2-6C2) affects the intensity values of the reflected light beam directly. Hence, the thickness profile determines the output signal, which is a function of location within the fundamental design of embodiment 2. Given the nature of the cursor maneuvering device ((203) of FIG. 2A) which moves on the tinted reference plane, this thickness profile feature has much to do with the resolution. Embodiment 3, however, has more to do with the system sensitivity (or, more precisely, color fidelity) of the tinted cursor maneuvering reference plane. This feature will be denoted by two factors and is illustrated in FIGS. 9D, 9H and 9L):

(1) SNR value (Signal to Noise Ratio) of the respective color index;
(2) FWHM (Full Width of Half Maximum) value in the measured signal spectra (i.e. as illustrated in FIGS. 9D, 9H, and 9L).

Embodiment 3 is a method derived from spectral analysis. It provides an adjustment of the sensitivity of the surface dyes for the purpose of aligning the fundamental functionality of the cursor maneuvering reference plane with the functionality of the photoreceptors in the mobile device. The prior arts have disclosed many methods for adjusting dye properties. In the present cursor maneuvering system of embodiment 3, the sensitivity of the dyes is directly aligned to that of the photoreceptor(s) or light source(s) rather than to some separate external spectrophotometer. This alignment has not been previously disclosed.

Most of the dyes currently in use can be adjusted for different color rendering effects, the prior art providing such adjustment methods as the use of basic or acetic solution pretreatment, various additives, plasma treatment, etc. Referring to FIG. 10, there is shown schematically the molecular structure of several dyes used by state of art color filters in the LCD (Liquid Crystal Display) industry. Note that there are many dyes in this industry, with FIG. 10 showing a small example of their molecular structures. It has been explained above that the K/S value will affect the color rendering effect of polymer fiber. There are other ways to achieve the same or equivalent result. For example, by adjusting the chemical bonding structures (e.g. location of $\pi$ bonds, etc., as are shown in FIG. 10) or other features of equivalent effect, the sensitivity of the dyes can be manipulated. When this property of the molecular structure is tuned, the spectral sensitivity of the tinted cursor reference plane can be aligned to that of the light source(s) or photoreceptors, or both.

Figure 9A:
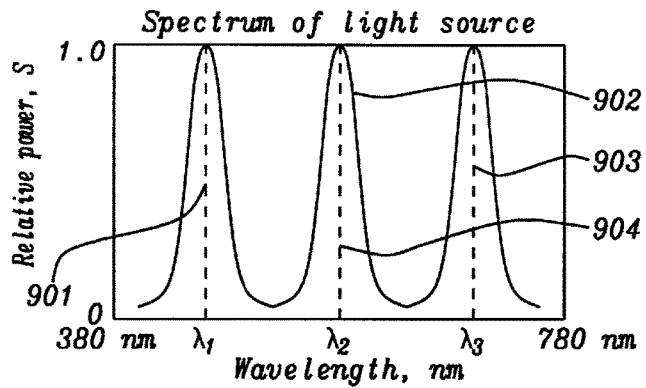
FIGS. 9A, 9B, 9C, and 9D graphically depict the fundamental physical principles of adjusting dye properties in forming a high sensitivity cursor maneuvering reference plane.
Figure 9B:
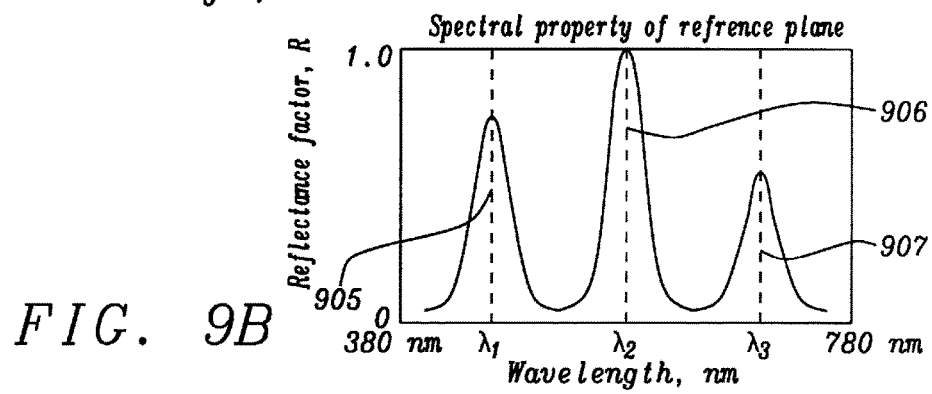
Figure 9C:
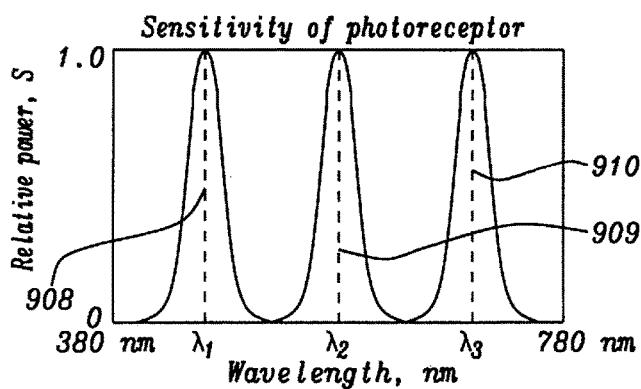
Figure 9D:
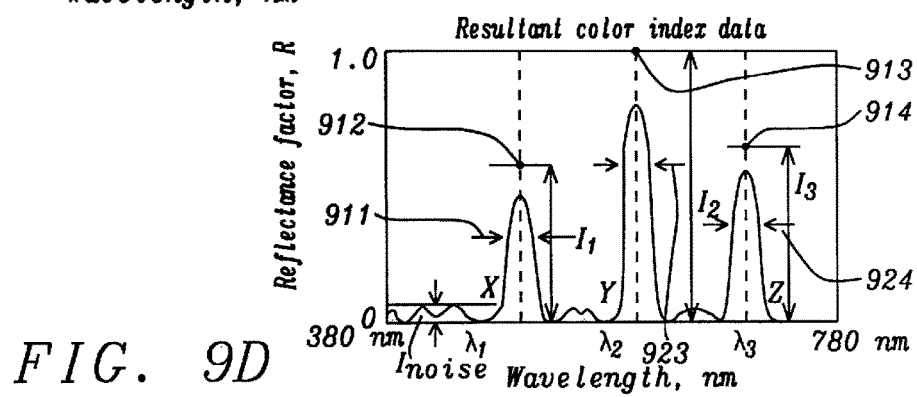
Figure 9E:
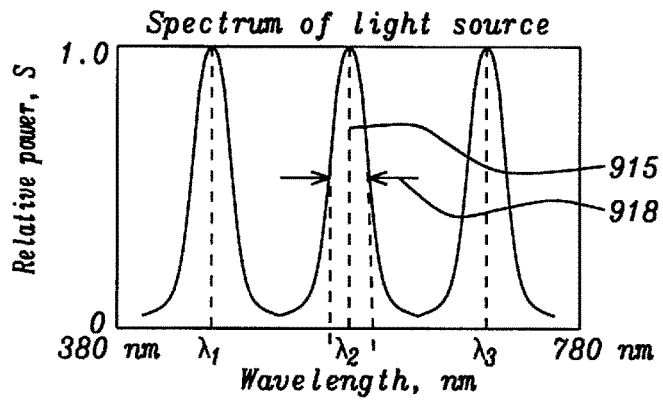
FIGS. 9E, 9F, 9G, and 9H graphically depict the alternative method of suppressing spurious spikes in the spectrum of reflectance values of dye materials, by realigning the sensitivity of the dye or light source to a different wavelength, $\lambda_4$.

Referring now back to FIG. 9A, there is shown, schematically, the power spectrum of a cursor maneuvering device that emits three light beams whose intensity peaks (i.e. peaks of S($\lambda$)) are located at $\lambda_1$, $\lambda_2$, and $\lambda_3$, respectively. When such light beams impinge on the disclosed cursor maneuvering reference plane, a portion of them will be reflected, and subsequently be detected by the photoreceptor embedded in the cursor maneuvering device. The reflectance curve of the reference plane (i.e. R($\lambda$)) is depicted schematically in FIG. 9B, and the sensitivity curve of the photoreceptor (i.e. $\bar{x}(\lambda)$, $\bar{y}(\lambda)$, or $\bar{z}(\lambda)$) is depicted schematically in FIG. 9C. After the data acquisition process, the resultant tri-stimuli color index value is derived, the exemplary curve being shown in FIG. 9D. According to colorimetry physics, (e.g., the optical physics adopted by CIE 1931 RGB), a tri-stimuli color index value (e.g. CIE 1931 RGB) can be calculated by the following formulas, $$X = \frac{1}{k} \int S(\lambda)R(\lambda)\bar{x}(\lambda)d\lambda \qquad (10)$$

$$Y = \frac{1}{k} \int S(\lambda)R(\lambda)\bar{y}(\lambda)d\lambda \qquad (11)$$

$$Z = \frac{1}{k} \int S(\lambda)R(\lambda)\bar{z}(\lambda)d\lambda \text{ where} \qquad (12)$$

$$k = \frac{100}{\int S(\lambda)\bar{y}(\lambda)d\lambda} \qquad (13)$$

Where S($\lambda$) denotes the spectrum of the respective light source, R($\lambda$) the reflectance value of the cursor maneuvering reference plane; $\bar{x}(\lambda)$, $\bar{y}(\lambda)$, and $\bar{z}(\lambda)$ the sensitivities of the photoreceptors, and k a normalizing factor.

According to equations (10) through (13), five parameters have to be adjusted in order to reach the optimized resultant signal profile of the color index values (i.e. S($\lambda$), R($\lambda$), and $\bar{x}(\lambda)$, $\bar{y}(\lambda)$, or $\bar{z}(\lambda)$). To collect the maximum light flux emitted by the respective light sources, it is desired that the peaks of the reflectance value (i.e. 905, 906, and 907 of FIG. 9B) to be as high as possible. In additions, the color index values outside the FWHM (Full Width Half Maximum, such as item 911) range should be as low as possible (i.e. the smaller the FWHM value the more the better result of alignment work). It is these factors that provide the highest sensitivities for the presently disclosed system. Hence, selecting proper dyes or processing methods is very critical to the ultimate performance of the tinted cursor maneuvering reference plane. Likewise, selecting proper pigments or dyes for aligning the light source or photoreceptor is also critical to the ultimate performance of the disclosed cursor maneuvering reference plane. As FIG. 9D shows, optimal results will be obtained if the following rules are satisfied, especially for applications associated with motion detection:

(1) The $SNR_{\lambda 1}$ $$\left(i.e. \frac{I_1}{I_{noise}}\right), SNR_{\lambda 2}\left(i.e. \frac{I_2}{I_{noise}}\right), SNR_{\lambda 3}\left(i.e. \frac{I_3}{I_{noise}}\right)$$

values shall be as high as possible.

(2) The STFWHMR values (Signal to FWHM Ratio, $$i.e., \frac{I_1}{FWHM_{\lambda_1}}, \frac{I_2}{FWHM_{\lambda_2}}, \frac{I_3}{FWHM_{\lambda_3}}\right)$$

shall be as high as possible.

Here $I_1$, $I_2$, and $I_3$ denote by the height of peak 912, 913, and 914 in FIG. 9D; $FWHM_{\lambda_1}$, $FWHM_{\lambda_2}$, and $FWHM_{\lambda_3}$ are denoted by item 911, 923, and 924, respectively.

If FIG. 9D is compared to FIG. 9H, it will be found that the X, Y, and Z values near to the respective peak positions ($\lambda_1$, $\lambda_2$, and $\lambda_3$) in FIG. 9D are confined in a range (i.e. the profiles of peaks are steeper) that is narrower than the corresponding values in FIG. 9H, which are spread over a wider range (i.e. |921|>|911|). The advantageous situation illustrated in FIG. 9D (FWHM is small) is attributed to a qualitative term called high color fidelity (i.e. 901, 905, and 908 are aligned to $\lambda_1$; 904, 906, and 909 are aligned to $\lambda_2$; 903, 907, and 910 are aligned to $\lambda_3$). Obviously, lower values of FWHMs are preferred. Embodiment 3 demonstrates the basic principle to be applied for optimality.

Figure 9F:
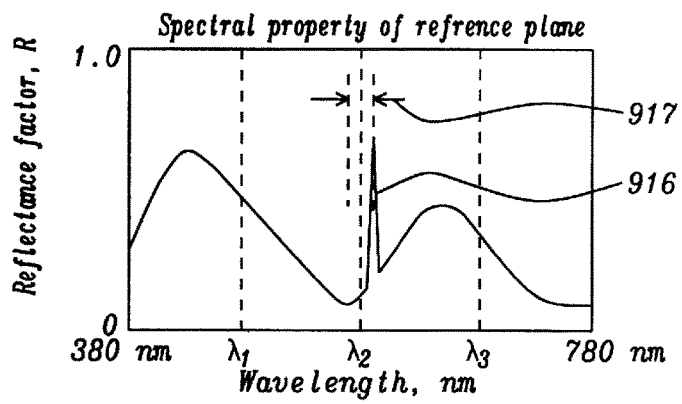
Figure 9G:
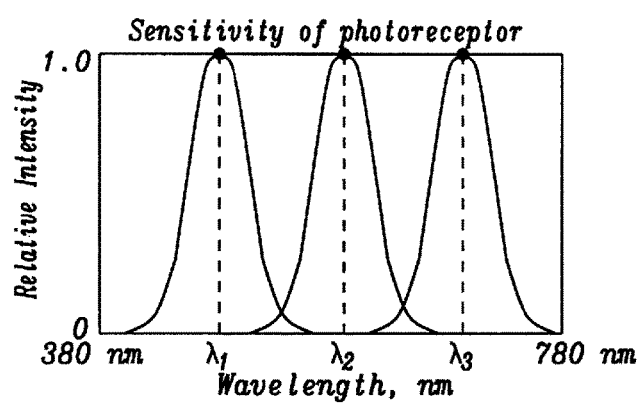
Figure 9H:
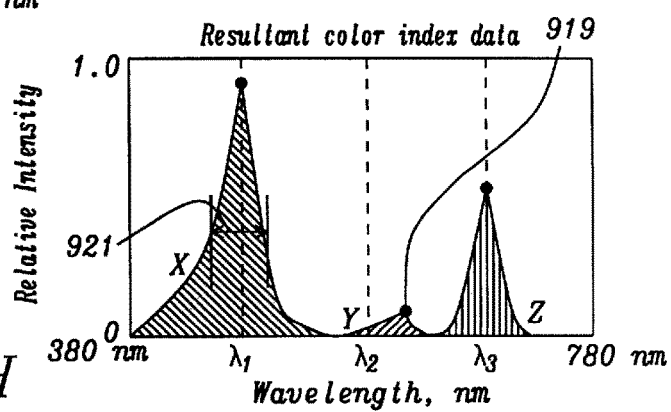
Figure 9I:
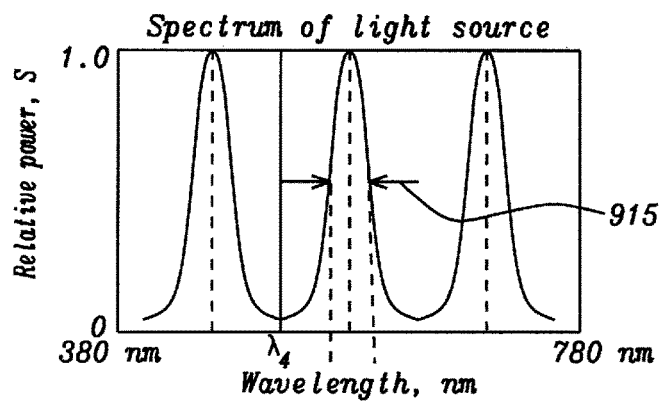
FIGS. 9I, 9J, 9K, and 9L depict a process for re-aligning the peak of light source, reflectance of a cursor maneuvering reference plane and photo-receptor to a now position in the spectrum, i.e., $\lambda_4$; such a process will avoid the interference caused by the spurious signals (916) in FIG. 9J.
Figure 9J:
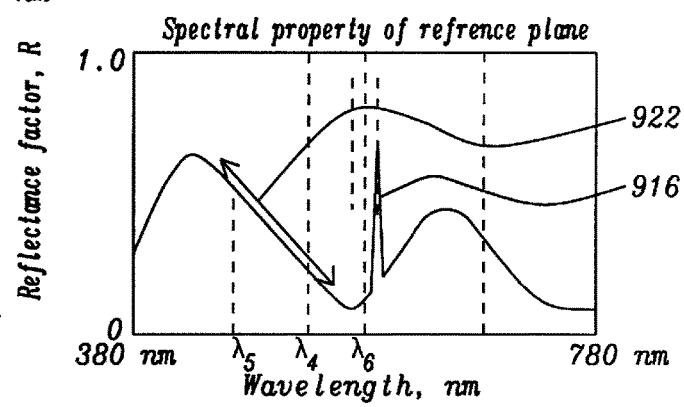
Figure 9K:
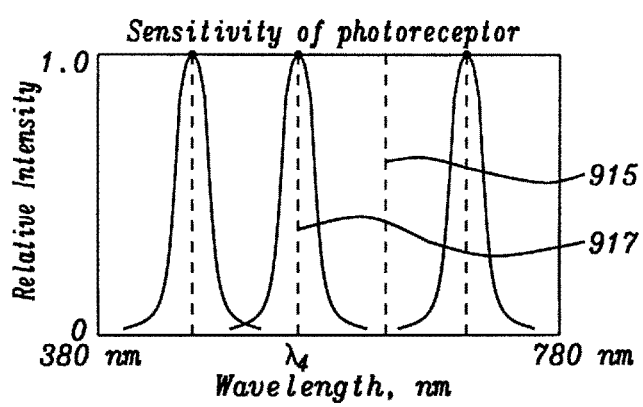
Figure 9L:
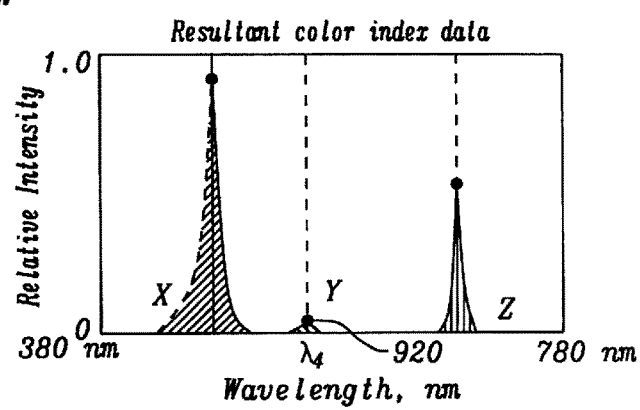

There are occasions where spurious spikes (e.g. 916 in FIG. 9F) may occur in the reflectance curve. Spurious spikes, which can be evident when the fluorescent effect is strong, will cause the intensity of light beams detected by the photoreceptor to rise/fall irregularly. This phenomenon is shown in FIGS. 9F, 9G, and 9H. As FIGS. 9F and 9H show, the spurious spike (916) has caused the peak of Y curve (919) to move off the preferred position ($\lambda_2$). There are at least three ways to remedy this problem: (1) Reduce the FWHM of the associated light beam (i.e. 918), (2) Relocate the peak of light source (915) elsewhere in the spectrum; (3) Reset the sensitivity of the dye used by the tinted reference plane and photoreceptor to a new position in the spectrum (FIGS. 9I, 9J, 9K, and 9L schematically depict the associated process). The new position is denoted by $\lambda_4$, which corresponds to the peak signal (920) in FIG. 9L. Note that the resultant Y signal (920) in FIG. 9L has been suppressed to a level which is lower than that of (919) in FIG. 9H. There is a fourth way which literally combines the methods used by the above three ways to achieve the specific coloring effects.

We now understand that fabricating a high sensitivity and high resolution 3D cursor maneuvering reference plane/surface requires special knowledge (e.g. as evident in embodiment 3). For example, it can be a serious mistake for one who uses a household inkjet printer (typically operating in the CMYK mode) as the means with which to fabricate a high sensitivity and high resolution 3D cursor maneuvering reference plane. Using such a printer may lead to drastic performance degradation of the system in that the color mode of the inkjet printer cannot easily be aligned to the mode of the photoreceptor embedded in the cursor maneuvering device (e.g. a RGB type) easily. Besides, the corresponding FWHMs of a conventional inkjet printer are usually much wider than the tinted reference plane requires for the sake of achieving a human eye color saturation effect. The driver program used by an inkjet printer is also not designed for high color fidelity purposes.

There is a fourth remedial mechanism. Instead of depositing three kinds of dyes in each dye layer (e.g. layers 601, 605, and 612 in FIGS. 6A2-6C2), an alternative approach is to deposit multiple dye types, e.g. an absorbing type or a reflective type, or even deposit a plurality of additives, in each layer to adjust the reflectance curve. The essential spirit of this remedy is still the same, in order to extract the most from the light flux irradiated from said light sources, and suppress the noise signal (i.e. $I_{noise}$ in FIG. 9D), the peaks (i.e. 905, 906, and 907 of the reflectance curves) should be as high as possible at the designated wavelength values while maintaining the sensitivity width of said peaks (i.e. similar to FWHM) to be as narrow as possible.

Embodiment 3 has provided one fundamental difference between the presently disclosed system and prior art. In prior art, the respective spectra of the absorption/reflectance of the dye/ink/pigment are often designed to have a decently "sloped" profile (much like that of 922 in FIG. 9J, whose wavelength range is large, i.e. between $\lambda_5$ and $\lambda_6$), so that the color saturation effect can be more easily reached. For the presently disclosed system, it is the SNR value that is preferred to be as high as possible and the FWHM value is preferred to be as low as possible.

Note that embodiments 2 and 3 can also be combined in many ways to produce a high sensitivity and high resolution cursor maneuvering reference plane. For example, analogously to the method taught by embodiment 2, one may form a dielectric mirror structure over the substrate (603) in FIG. 6A1, in which the dielectric mirror structure is formed by a stack of dielectric layers having different refractive indexes, each of which has a predefined thickness selected to be close to one quarter of the wavelength of a specific light beam. Note that a dielectric mirror does NOT require any dye or pigment to adjust its bandwidth of reflectance. But the essential spirit of this application is the same as that of the presently disclosed tinted reference plane. When the thickness of one layer (e.g. 601, 605, or 612) in FIG. 6A1, 6A2, or 6A3 is about one quarter of the wavelength of a light beam, and the refractive index of that layer is controlled in a specific way (e.g. $n_{601} > n_{605}$), that layer may cause destructive interference with the light beam ($n_{601}$ and $n_{605}$ are the refractive index of layer 601 and 605, respectively). Thus, one can manipulate the thickness of the dielectric layer (e.g. from thinner than one quarter of wavelength to one quarter of wavelength along, for example, the X-Axis direction in FIG. 6A1) to adjust the intensity of the reflected light beams. This is equivalent to adjusting the SNR value and STFWHM value except there is NO dye or pigments being used in this case.

Finally, the presently disclosed cursor maneuvering reference plane/surface, and mobile device associated with it, are not limited to be used only with colored (visible) light. There are other equally viable methods associated with, for example, polarity of light, fluorescence, etc., that can be used to achieve the same results based on the same design rule(s). If proper dye materials are selected, the present results can be obtained by electromagnetic radiation in a wavelength regime other than that of visible light, such as invisible light wavelengths of IR or UV, or in different polarity. A similar color gamut to that represented by FIG. 2B will be obtained, where in this case, the tip points L1, L2, and L3 are associated with certain invisible light(s) or polarized light.

As is understood by a person skilled in the art, the preferred embodiments of the present disclosure are illustrative of the present disclosure rather than being limiting of the present disclosure. Revisions and modifications may be made to methods, processes, materials, structures and dimensions through which a 3D maneuvering system using color or other electromagnetic wave detection methods to encode absolute positional data on a tinted reference plane is made and used, while still providing such methods, processes, materials, structures and dimensions in accord with the present disclosure as defined by the appended claims.

What is claimed is:

1. A method for fabricating a planar reference surface for a cursor maneuvering device, comprising:

providing a substrate having a planar or locally planar surface;

forming on said substrate a coating configured to create at least a two hue gamut from a continuous distribution of hue values wherein said hue values correspond to wavelengths of electromagnetic radiation incident from an external source or sources that is reflected, refracted, interfered with or emitted by said coating when said electromagnetic radiation impinges on said coating and wherein there is a spectral intensity that characterizes the incident intensity of said electromagnetic radiation and there is a surface spectral intensity, that characterizes the response of said coated surface to said incident radiation, whereby there is created an intensity of hue values that are reflected, refracted, interfered with or emitted by said coating when said coating is impinged upon by said electromagnetic radiation from said external source or from said external sources, whereby each point on said coating has associated unique value of said reflective, refracted, interfered with or emissive spectral intensity and wherein by optimally aligning said values of incident radiation intensity and surface spectral intensity with the spectral sensitivity of a photoreceptor in said maneuvering device to produce an encoding of said substrate by said maneuvering device is created that provides a mapping of said hue values to absolute three-dimensional positional data of high resolution and high sensitivity and whereby closely neighboring points on said substrate may be resolved with minimal interference between their encoded absolute positional data.

2. The method of claim 1 wherein said coating is formed by a printing process.

3. The method of claim 2 wherein said printing process is effected using low-cost commercially available printers.

4. The method of claim 1 wherein said coating is formed by a diffusion of dyes or pigments into said substrate whereby said coating has no substantial thickness profile.

5. The method of claim 1 wherein said substrate is repositioned relative to a printing device so that a sequence of color depositions is formed with respective tint profiles varying along different directions within said substrate plane.

6. The method of claim 1 wherein said coating creates a three hue gamut that associates a unique hue with every position on said planar reference surface that is reachable by said maneuvering device.

7. The method of claim 6 wherein said three hue gamut is a three color gamut that corresponds to colors within the wavelength range of visible light.

8. The method of claim 6 wherein said hue gamut is adjusted so that the emitted spectral intensity of its electromagnetic wave spectrum is optimally aligned with sensitivities of a photoreceptor in said maneuvering device used to capture said electromagnetic waves.

9. The method of claim 1 wherein dyes and pigments are deposited in said coating on a nanometer size scale to produce a continuous color gradient and, thereby, to enhance the capture of non-linear motions.

10. The method of claim 1 wherein said 2D planar or locally planar reference surface is fabricated in a manner allowing it to be used for high resolution encoding whereby linear and non-linear components of motion may be determined.

11. The method of claim 1 wherein said 2D planar or locally planar reference surface is fabricated for high color sensitivity, by optimally aligning said surface distribution of colors with intensities of said external source or external sources of electromagnetic radiation.

12. The method of claim 1 wherein said absolute three-dimensional positional data of high resolution and high sensitivity is configured to create a virtual three-dimensional display in a display device or to enable the displayed objects to translate and rotate.

13. The method of claim 1 wherein said planar reference surface is configured as a two hue gamut and is used to create a high-resolution mapping to a two-dimensional display space by means of the motion of said maneuvering device over said planar reference surface wherein said maneuvering device is configured to receive two hues of said two hue gamut and wherein said maneuvering device comprises a set of photoreceptors sensitive to said two hues and whose sensitivities are optimally aligned with the reflected spectral intensity of said two hues.

* * * * *